(12) United States Patent
Watanabe et al.

(10) Patent No.: US 8,819,036 B2
(45) Date of Patent: Aug. 26, 2014

(54) COMPUTER PRODUCT, SEARCH METHOD, SEARCH APPARATUS, AND NODE

(75) Inventors: Takashi Watanabe, Kawasaki (JP); Yoshihiro Tsuchiya, Yokohama (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 13/458,666

(22) Filed: Apr. 27, 2012

(65) Prior Publication Data

US 2012/0317130 A1 Dec. 13, 2012

(30) Foreign Application Priority Data

Jun. 13, 2011 (JP) ................................. 2011-131220

(51) Int. Cl.
*G06F 7/00* (2006.01)
*G06F 17/30* (2006.01)

(52) U.S. Cl.
USPC ............ 707/756; 707/737; 707/754; 707/769

(58) Field of Classification Search
None
See application file for complete search history.

(56) References Cited

U.S. PATENT DOCUMENTS

| | | | |
|---|---|---|---|
| 2002/0143755 A1* | 10/2002 | Wynblatt et al. | 707/3 |
| 2005/0021758 A1* | 1/2005 | White | 709/226 |
| 2005/0055327 A1* | 3/2005 | Agrawal et al. | 707/1 |
| 2005/0108368 A1* | 5/2005 | Mohan et al. | 709/220 |
| 2006/0069719 A1* | 3/2006 | McCanne et al. | 709/203 |
| 2007/0282915 A1* | 12/2007 | Vosshall et al. | 707/200 |
| 2009/0037456 A1* | 2/2009 | Kirshenbaum et al. | 707/102 |
| 2010/0306812 A1* | 12/2010 | Slothouber et al. | 725/114 |
| 2010/0318795 A1* | 12/2010 | Haddad et al. | 713/168 |
| 2012/0221571 A1* | 8/2012 | Orman | 707/737 |

FOREIGN PATENT DOCUMENTS

| | | |
|---|---|---|
| JP | 63-317859 A | 12/1988 |
| JP | 7-302267 A | 11/1995 |
| JP | 2005-234759 A | 9/2005 |

\* cited by examiner

*Primary Examiner* — Dung K Chau
(74) *Attorney, Agent, or Firm* — Fujitsu Patent Center

(57) ABSTRACT

Nodes respectively store a multilayer transposed Bloom filter. A client selects a node N1 from among the group of nodes and transmits a search request to the node N1. Upon receiving a reply from the node N1, the client determines whether the received search result indicates "positive". If the search result is not positive, the client selects in order of node number, a node N2 and transmits a search request to the node N2. Upon receiving a reply from the node N2, the client determines whether the received search result indicates "positive". Upon determining that the search result is positive, the client outputs the search result and ends the search notification process.

9 Claims, 19 Drawing Sheets

| HEADER | | PAYLOAD | |
|---|---|---|---|
| SOURCE | DESTI-NATION | TYPE | SEARCH DATA |
| C1 | N1 | SEARCH | Dx |

(B) 602

| HEADER | | PAYLOAD |
|---|---|---|
| SOURCE | DESTI-NATION | SEARCH RESULT |
| N1 | C1 | - |

FIG.7

(A) Packet 701

| HEADER | | PAYLOAD | |
|---|---|---|---|
| SOURCE | DESTI-NATION | TYPE | SEARCH DATA |
| C1 | N2 | SEARCH | Dx |

(B) Packet 702

| HEADER | | PAYLOAD |
|---|---|---|
| SOURCE | DESTI-NATION | SEARCH RESULT |
| N2 | C1 | Dx |

| HEADER | | PAYLOAD | |
|---|---|---|---|
| SOURCE | DESTI-NATION | TYPE | REGISTRATION DATA |
| C1 | N2 | REGI-STER | Dx |

(B) 1402

| HEADER | | PAYLOAD |
|---|---|---|
| SOURCE | DESTI-NATION | BLOCK NUMBER |
| N2 | C1 | 4 |

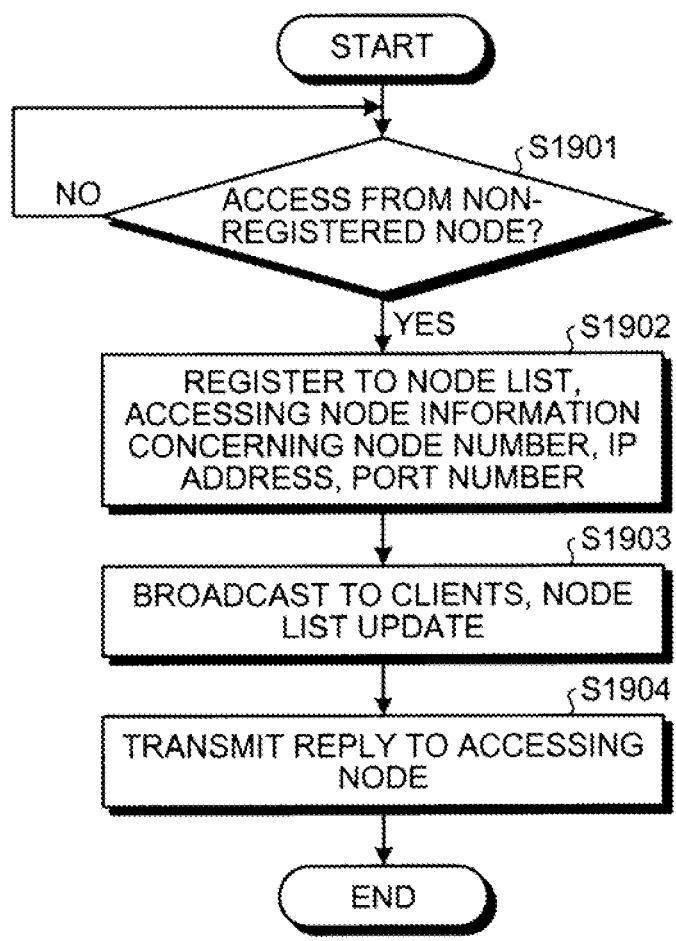

COMPUTER PRODUCT, SEARCH METHOD, SEARCH APPARATUS, AND NODE

CROSS REFERENCE TO RELATED APPLICATIONS

This application is based upon and claims the benefit of priority of the prior Japanese Patent Application No. 2011-131220, filed on Jun. 13, 2011, the entire contents of which are incorporated herein by reference.

FIELD

The embodiment discussed herein is related to data searching.

BACKGROUND

Conventionally, when a large volume of data is managed by a tree data structure, management by a data structure called a B-tree is performed in a relatively large number of cases. Compared to a simple binary tree, a B-tree stores multiple data entries in one block and consequently, offers the advantage of being able to reduce the degree to which the shape of the tree data structure changes even when data entries are added. Therefore, a B-tree is often used as a data management method for disks such as hard disks.

However, when data managed on a disk by a tree data structure is searched, multiple data blocks have to be read in. Further, in general, the input/output (I/O) of a disk is relatively slow compared to memory access and consequently, data searches on disks are time consuming.

Therefore, to prevent search delays consequent to disk I/O, countermeasures such as the storage of a tree data structure in a memory are under consideration. In this case, in a B-tree, when the number of data entries becomes large, there is a risk of the amount of corresponding memory increasing. Thus, a method is also under consideration where in the tree data structure, only the portions that are often read in are stored to the memory (cache).

Meanwhile, data structures called Bloom filters have also become well known. A Bloom filter is a method of efficiently determining whether an entry belongs to an existing set.

Further, technologies have been disclosed that in information searches, search multiple servers by a daisy chain technique. Technologies have been disclosed that in information searches, estimate hit rates and read out contents having a high hit rate. Technologies have been further disclosed that in information searches, use alternative search conditions, in descending order of the rate at which data requested by the user is included in the alternative search conditions. For examples, refer to Japanese Laid-Open Patent Publication Nos. 2005-234759, S63-317859, and H7-302267.

As described, since B-trees can cope with a large volume of data, if cache is suitably prepared, disk I/O can be reduced. However, disk I/O cannot be reduced beyond a given point. Furthermore, if the tree data structure changes consequent to the addition of data entries, I/O for tree data structure management may become necessary. The Bloom filter only determines the presence of data entries and therefore, cannot be used as is for data management.

In addition, the amount of memory that the Bloom filter consumes is proportional to the volume of data that can be managed. Therefore, when the Bloom filter is applied to a redundancy deleting storage system, a problem arises in that the capacity of the entire system is determined by the amount of memory that can be provided to a node.

SUMMARY

According to an aspect of an embodiment, a computer-readable medium stores therein a search program that causes a transmission source computer to execute a process. The transmission source computer has access to a node group. Each node of the node group stores a data structure having a multilayer transposed Bloom filter that is transposed by gathering, at each level, bits at identical positions in each Bloom filter constituting a Bloom filter row in a multilayer Bloom filter having a level count h, a bit width s, a divisor d of an h-th level of arranged bits indicating false positive or negative, a p-th ($1 \leq p \leq h$) level Bloom filter bit width $m = s/d^{[h-(p-1)]}$ and a p-th level Bloom filter count $n = d^{[h-(p-1)]}$. The data structure further has a data block set corresponding to a first level Bloom filter row of the multilayer Bloom filter. Each node further executes processing that involves using the multilayer transposed Bloom filter to determine whether search data is present in the data block set and transmitting to the transmission source computer of the search data, a search result indicating whether the search data is present. The process includes selecting from the node group, an unselected node; transmitting the search data to the selected node; receiving the search result from the selected node; determining whether the received search result indicates the search data to be present; and outputting a determination result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6 and 7 are diagrams of examples of the data structures of a search request and a reply.

FIG. 14 is a diagram of an example of the data structure of an entry request and a reply.

FIG. 19 is a flowchart of an example of node addition processing performed by the management server M.

DESCRIPTION OF EMBODIMENTS

Preferred embodiments of the present invention will be explained with reference to the accompanying drawings.

Figure 1:
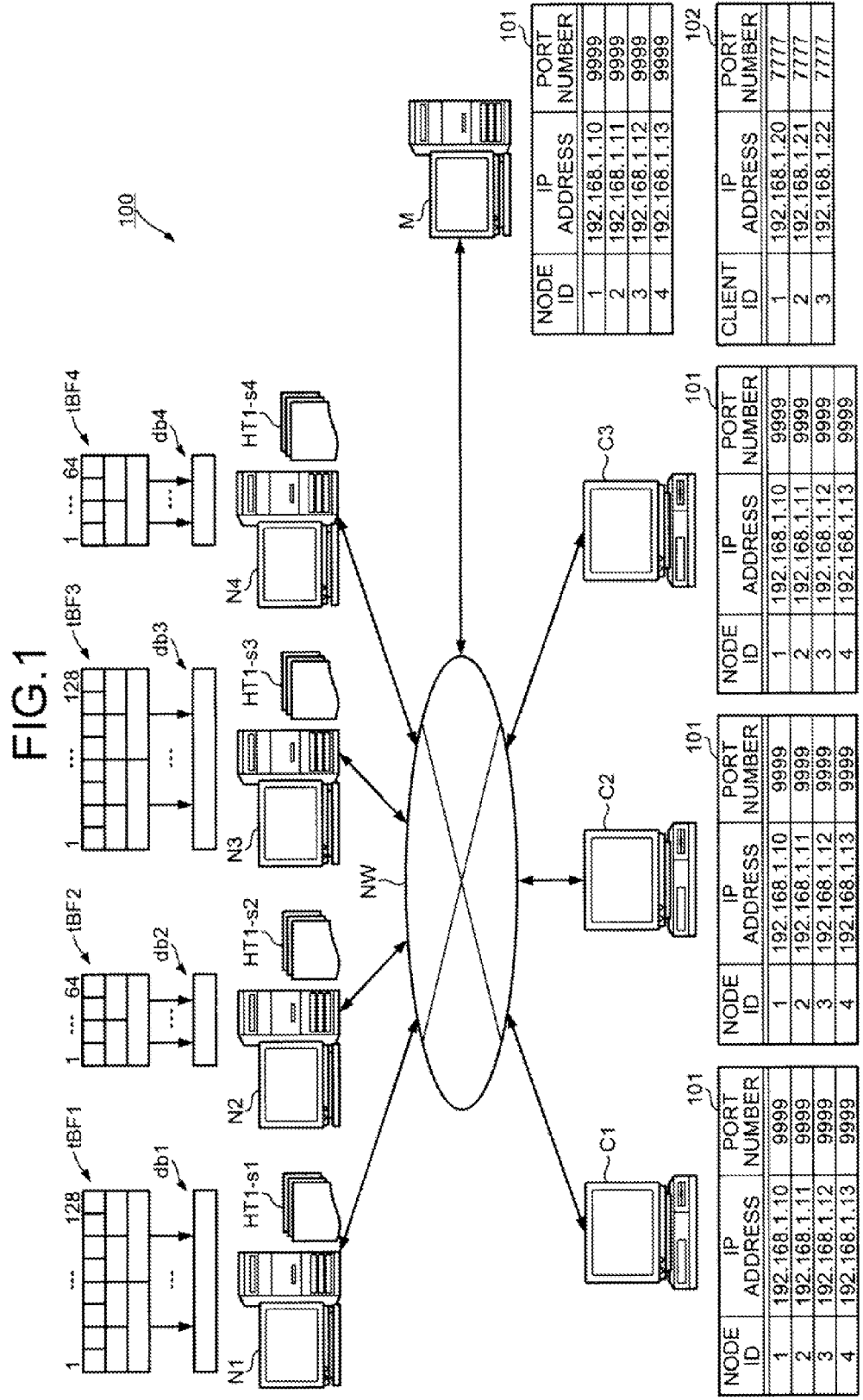
FIG. 1 is a diagram depicting an example of a system configuration of a search system according to an embodiment.

FIG. 1 is a diagram depicting an example of a system configuration of a search system according to an embodiment. As depicted in FIG. 1, a search system 100 is configured such that multiple nodes N1 to N4 (in the example depicted in FIG. 1, 4 nodes), a management server M, and one or more clients C1 to C3 (in the example depicted in FIG. 1, 3 clients) are communicably connected through a network NW. The network NW may be, for example, a local area network (LAN), a wide area network (WAN), the Internet, etc.

In the present embodiment, the nodes N1 to N4 have a multilayer transposed Bloom filter (tBF1 to tBF4), respectively. The multilayer transposed Bloom filters tBF1 to tBF4 are index information obtained by transposing respective multilayer Bloom filters.

A multilayer Bloom filter is index information constituted by Bloom filters arranged in a hierarchical structure. A Bloom filter is index information constituted by arranged bits indicating false positives (i.e., pseudo-positives) or negatives in a given number of data blocks. When a Bloom filter bit is ON, false positive is indicated and when OFF, negative is indicated. A bit value of 1 may be regarded as ON, while a value of 0 is regarded as OFF; or a bit value of 0 may be regarded as ON, while a value of 1 is regarded as OFF. In the present embodiment, a bit value of 1 is regarded as ON (false positive) and a value of 0 is regarded as OFF (negative).

A multilayer Bloom filter will be described hereinafter with reference to FIG. 2. The relation between a multilayer Bloom filter and a multilayer transposed Bloom filter tBFi (i=1 to 4, where i corresponds to the reference numeral assigned to a node) will be described hereinafter with reference to FIG. 3. The multilayer transposed Bloom filters tBF1 to tBF4 are respectively independent. The layer count (level count), the bit width, and the divisor may be respectively identical among the multilayer transposed Bloom filters tBF1 to tBF4. Further, any among the layer count (level count), the bit width, and the divisor may differ between at least 2 of the multilayer transposed Bloom filters tBF1 to tBF4.

In FIG. 1, as an example, the layer count of the multilayer transposed Bloom filter tBF1 is assumed to be 3. Accordingly, the multilayer transposed Bloom filter tBF1 is a Bloom filter in which a transposed Bloom filter row tBF1(1) at the first level (lowest level), a transposed Bloom filter row tBF1(2) at the second level, and a transposed Bloom filter row tBF1(3) at the third level (highest level) are layered.

In FIG. 1, as an example, a bit width s1 of the multilayer transposed Bloom filter tBF1 is assumed to be 128 bits.

Further, in FIG. 1, as an example, the layer count of the multilayer transposed Bloom filter tBF2 is assumed to be 3. Accordingly, the multilayer transposed Bloom filter tBF2 is a Bloom filter in which a transposed Bloom filter row tBF2(1) at the first level (lowest level), a transposed Bloom filter row tBF2(2) at the second level, and a transposed Bloom filter row tBF2(3) at the third level (highest level) are layered.

In FIG. 1, as an example, a bit width s2 of the multilayer transposed Bloom filter tBF2 is assumed to be 64 bits.

Further, in FIG. 1, the layer count of the multilayer transposed Bloom filter tBF3 is assumed to be 4. Accordingly, the multilayer transposed Bloom filter tBF3 is a Bloom filter in which a transposed Bloom filter row tBF3(1) at the first level (lowest level) to a transposed Bloom filter row tBF3(4) at the fourth level (highest level) are layered.

In FIG. 1, as an example, a bit width s3 of the multilayer transposed Bloom filter tBF3 is assumed to be 128 bits.

Further, in FIG. 1, the layer count of the multilayer transposed Bloom filter tBF4 is assumed to be 3. Accordingly, the multilayer transposed Bloom filter tBF4 is a Bloom filter in which a transposed Bloom filter row tBF4(1) at the first level (lowest level), a transposed Bloom filter row tBF4(2) at the second level, and a transposed Bloom filter row tBF4(3) at the third level are layered.

In FIG. 1, as an example, a bit width s4 of the multilayer transposed Bloom filter tBF4 is assumed to be 64 bits.

A data block set dbi (i=1 to 4) is associated with the multilayer transposed Bloom filter tBFi. The data block set dbi is assumed to have a bit width that is the same as the bit width si (i=1 to 4) of the multilayer transposed Bloom filter tBFi.

The data block set dbi has multiple data blocks, each data block storing registered data. The data blocks are indicated as dbi-#, where # is a numeral and indicates the block number. The block number # corresponds to the bit position of the data block dbi-#.

A hash table group HTi (i=1 to 4)-si is a set of hash tables that correspond to the data blocks dbi-# the in data block set dbi. The hash tables are indicated as HTi-#, where, # is a numeral and coincides with the block number of the data block dbi-#. The hash table HTi-# is a table associating hash values obtained when data is substituted into a given hash function and the data from which the hash values are obtained (the data may be the actual data or a pointer to the data).

The management server M is a computer that manages the nodes N1 to N4. The management server M has a client list 102 and a node list 101. When a node is newly added, the management server M updates the node list 101, refers to the client list 102, and notifies the clients C1 to C3 of the node addition. Although the management server M may be a physical machine, the management server M may cause any one of the nodes to function as a virtual machine.

The client list 102 has fields for client IDs, IP addresses, and port numbers. By entering information into the fields, the information is stored as records. The client ID field stores identification information indicating clients that can access the nodes N1 to N4 through the network NW. The IP address field stores the IP addresses of clients and the port number field stores port numbers. The client list 102, for example, is stored in a storage device such as a ROM 402, a RAM 403, a magnetic disk 405, and an optical disk 407 depicted in FIG. 4.

The node list 101 has fields for node IDs, IP addresses, and port numbers. By entering information into the fields, the information is stored as records. The node ID field stores node identification information. In FIG. 1, the node ID corresponds to the reference numeral assigned to the node. The IP address field stores node IP addresses and the port number field stores port numbers from which clients can access nodes through the network NW. The node list 101, for example, is stored in a storage device such as the ROM 402, the RAM 403, the magnetic disk 405, and the optical disk 407 depicted in FIG. 4.

The clients C1 to C3 are computers that use the nodes N1 to N4. The clients C1 to C3 have the node list 101, respectively. The clients C1 to C3 may execute data registration notification processing and data search notification processing with respect to the nodes N1 to N4, through the management server M; or may execute data registration notification processing and data search notification processing with respect to the nodes N1 to N4, without going through the management server M. Further, configuration may be such that the nodes N1 to N4 have the client list 102 and the management server M is not provided.

In the search system 100 configured as such, search data is provided thereto, the multilayer transposed Bloom filter tBFi is referred to, and a data block dbi-# in which the search data is assumed to be present is identified. If no data block dbi-# is identified, the search data is not present in any of the data blocks dbi-# of the multilayer transposed Bloom filter tBFi (negative). On the contrary, even if a data block dbi-# is identified, the search data is not necessarily present in the identified data block dbi-# (false positive).

Whether a false positive is ultimately positive or negative depends on the search results of the hash table HTi-# corresponding to the identified data block dbi-#. For example, if the hash value of the search data is hit in the hash table HTi-# corresponding to the identified data block dbi-#, the false positive is ultimately positive and if the hash value is not hit, the false positive is ultimately negative.

The multilayer Bloom filter from which the multilayer transposed Bloom filter tBFi depicted in FIG. 1 is transposed will be described.

Figure 2:
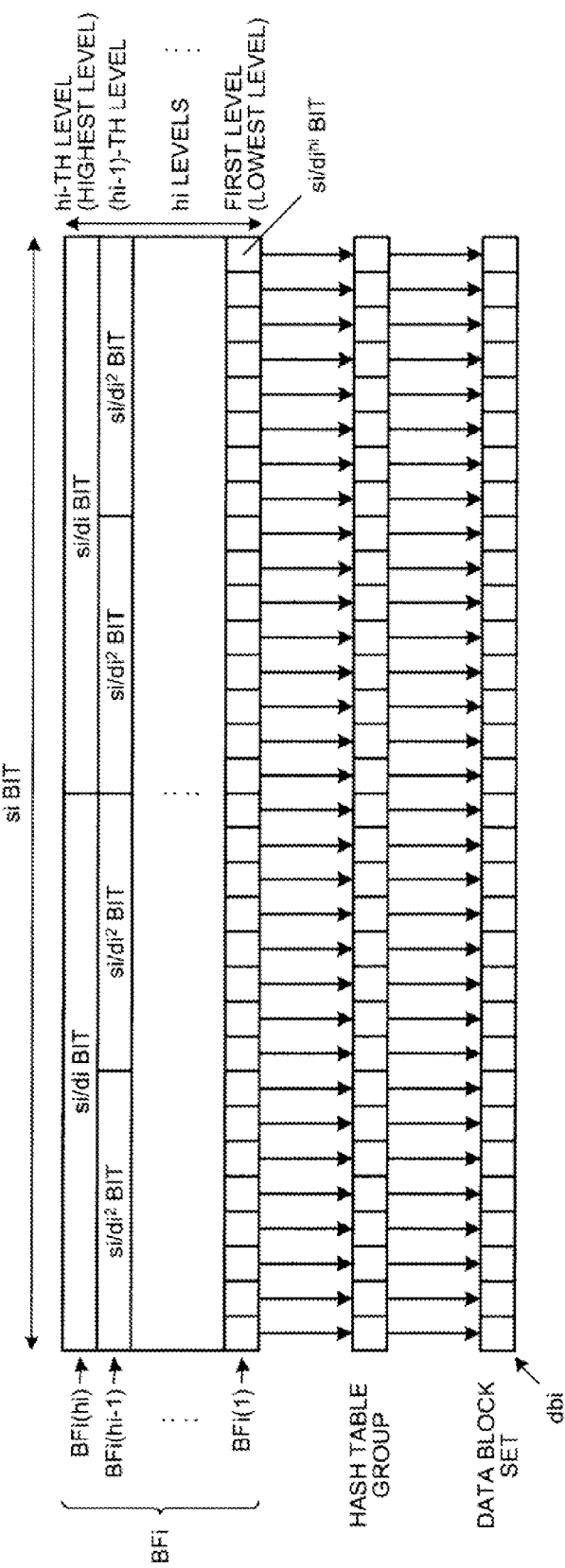
FIG. 2 is a diagram of an example of a multilayer Bloom filter.

FIG. 2 is a diagram of an example of a multilayer Bloom filter. A multilayer Bloom filter BFi is configured by an hi (i=1 to 4) level×si bit width memory area. The si bit width corresponds to the bit width of the data block set dbi. The bit length si of each level is divided by a divisor di (i=1 to 4), which is the hi-th level (highest level). Each resulting bit string is a Bloom filter of the Bloom filter row at the respective level. The divisor di is basically an integer of 2 or more. However, in a case where the hi-th level (highest level) is a single Bloom filter, the divisor di may be regarded as di=1.

Assuming an arbitrary level as p, the bit width mi of a Bloom filter bfi(p) in a Bloom filter row BFi(p) at the p-th level is $mi=si/di^{[hi-(P-1)]}$. In the example depicted in FIG. 2, di=2 is assumed. The count ni of the Bloom filters bfi(p) in the p-th level Bloom filter row BFi(p) is $ni=di^{[hi-(p-1)]}$.

Therefore, in the multilayer Bloom filter BFi, the lower the level (the smaller hi) is, the greater the count of the Bloom filters bfi(p) in the p-th level Bloom filter row BFi(p) is. The count of the Bloom filters bfi(1) in the Bloom filter row BFi(1) at the lowest level (1st level) is equivalent to the number of data blocks dbi-#.

Thus, a Bloom filter bfi(1) that is hit when the first level is reached and a data block dbi-# have a one-to-one correspondence. Further, the level count hi of the multilayer Bloom filter BFi is basically greater than 1, but may be a level count of 1 (hi=1). However, in this case, di≠1 is assumed.

Effects of a Bloom filter false positive will be described. The false positive probability FPRi of a Bloom filter, in the case of an mi-bit length Bloom filter having hi levels and where, data registration count Ni (Ni<mi) and the number of hash functions is ki, can be expressed as the following equation from the Bloom filter properties.

$$FPRi=\{1-(1-1/mi)^{kiNi}\}^{ki} \approx \{1-e^{(-kiNi/mi)}\}^{ki} \qquad (1)$$

In this case, by changing ki, mi, and Ni, the false positive probability FPRi can be reduced significantly. In other words, according to the settings of ki, mi, and Ni, the false positive probability FPRi can be set to a value significantly smaller than 1 (substantially 0).

Further, if the data block count Ndbi is assumed as $di^{hi}$, the height level count hi can be expressed by the following equation.

$$hi=\log(Ndbi)/\log(di)+1 \qquad (2)$$

Although equation (2) assumes log(Ndbi)/log(di) to be divisible, when not so, by changing according to level, the value of di to another level, hi can be determined.

In the search processing, comparisons equivalent in number to the hash value count (ki (constant)) have to be performed and the number of filters to be filtered at 1 level in the search is at most di. Therefore, the memory access count MAi for the search is at most that represented by the following equation.

$$MAi=ki \times di \times \log(Ndbi)/\log(di) \qquad (3)$$

The multilayer transposed Bloom filter tBFi will be described. By transposing the multilayer Bloom filter BFi depicted in FIG. 2, the search speed can be made faster than that of the multilayer Bloom filter BFi.

Figure 3:
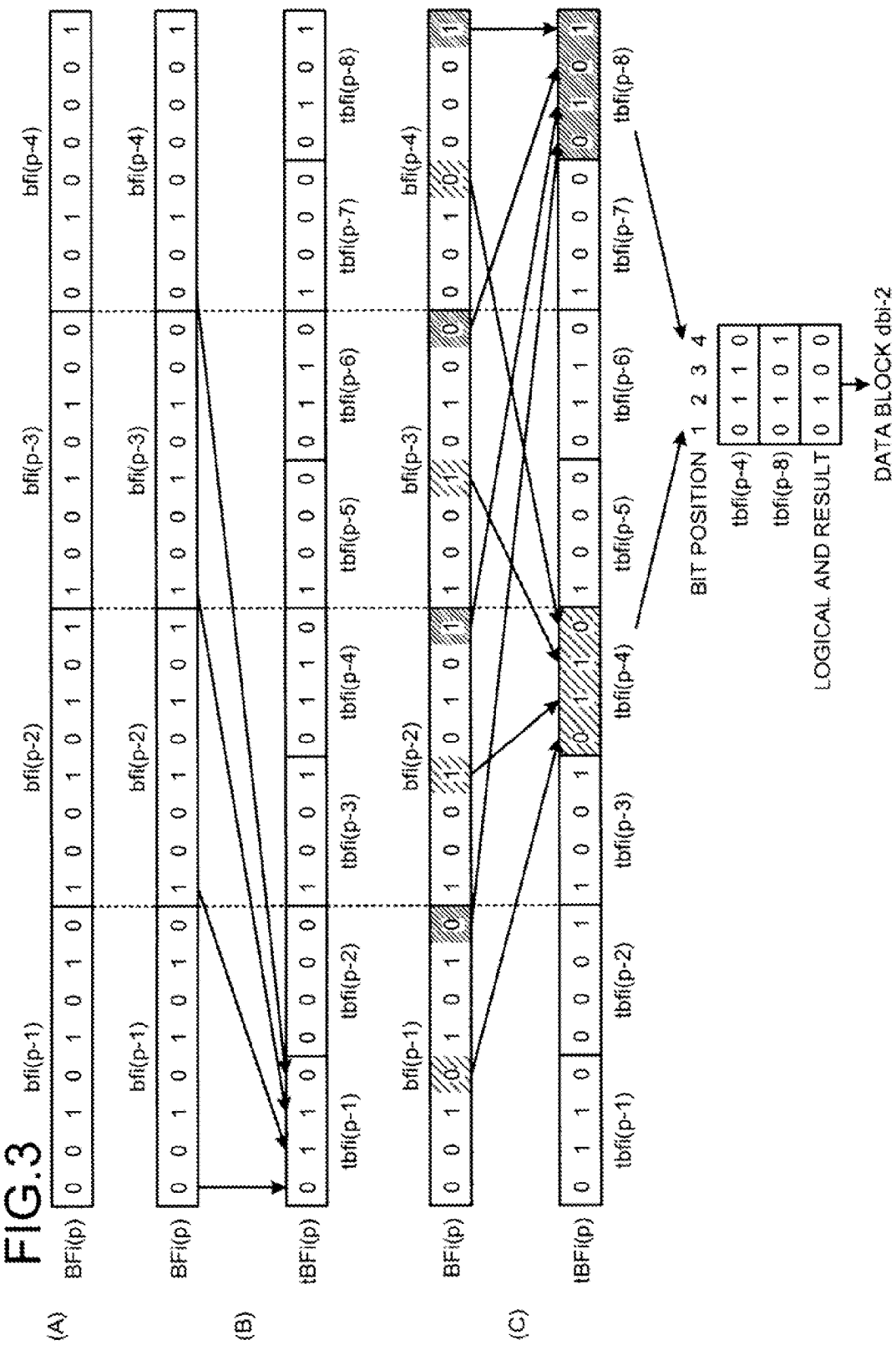
FIG. 3 is a diagram of a transposition example of a p-th level Bloom filter row BFi(p) in the multilayer Bloom filter Bfi.

FIG. 3 is a diagram of a transposition example of a p-th level Bloom filter row BFi(p) in the multilayer Bloom filter BFi. Section (A) depicts a Bloom filter row BFi(p). Here, as an example, the Bloom filter row BFi(p) is depicted divided into 4 Bloom filters bfi(p–1) to bfi(p–4). In other words, Bloom filter row BFi(p) is a bit string of 8 bits×4 filters, and when transposed, becomes a bit string of 4 bits×8 filters. In other words, the count and the bit width are interchanged.

Section (B) depicts transposition of the Bloom filter row BFi(p). When transposition is performed, bits at the same position in each of the Bloom filters bfi(p–1) to bfi(p–4) are gathered and the resulting bit strings gathered according to position are arranged in order of bit position.

The head bit of each of the Bloom filters bfi(p–1) to bfi(p–4) are gathered in order of filter position number, forming a bit string {0110}. The head bit from the left, "0", is the head bit of the Bloom filter bfi(p–1), the second bit "1" is the head bit of the Bloom filter bfi(p–2), the third bit "1" is the head bit of the Bloom filter bfi(p–3), and the tail bit "0" is the head bit of the Bloom filter bfi(p–4).

The bit string {0110} is designated as a transposed Bloom filter tbfi(p–1). For the second to tail bit positions, the bits are similarly gathered, obtaining transposed Bloom filters tbfi(p–1) to tbfi(p–8). Index information constituted by the transposed Bloom filters tbfi(p–1) to tbfi(p–8) arranged in order of bit position is the transposed Bloom filter row tBFi(p). By generating a transposed Bloom filter row tBFi(p) at each level, the multilayer transposed Bloom filter tBFi is obtained.

Section (C) depicts a search comparison example for the Bloom filter row BFi(p) and the transposed Bloom filter row tBFi(p). In this example, 2 hash values of data D are obtained by 2 types of hash functions and the remainders resulting from division thereof by the bit width 10 of the Bloom filters bfi(p) in the Bloom filter row BFi(p) are assumed as "4" and "8".

When a search is performed using the Bloom filter row BFi(p), a Bloom filter bfi(p) in which the bits at the bit positions "4" and "8" (which are the remainders "4" and "8") are both ON is searched for in the Bloom filter row BFi(p). In this example, the Bloom filter bfi(p–2) meets these conditions.

On the other hand, when the transposed Bloom filter row tBFi(p) is used, a Bloom filter bfi(p) in which the bits at the bit positions "4" and "8" are both ON is not searched for like with the Bloom filter row BFi(p). Instead, transposed Bloom filters tbfi(p−4), tbfi(p−8) having filter position numbers that are equivalent to the remainders "4" and "8" are extracted. The extracted transposed Bloom filters tbfi(p−4), tbfi(p−8) are subject to logical AND operation, whereby the bit position "2", which is also ON is identified.

In the case of the Bloom filter row BFi(p), the fourth and the eighth bits are referred to among the 4 Bloom filters bfi(p−1) to bfi(p−4) and consequently, 8(=4×2) memory accesses are required. On the other hand, the transposed Bloom filter row tBFi(p) is index data folded according to each bit position of the Bloom filter bfi(p−1) to bfi(p−4) before transposition. Accordingly, determination by 2 memory accesses (for extracting the transposed Bloom filters tbfi(p−4), tbfi(p−8)) and the logical AND operation is possible. Consequently, the frequency of memory accesses can be lower than that for the multilayer Bloom filter BFi, thereby increasing the search speed.

Figure 4:
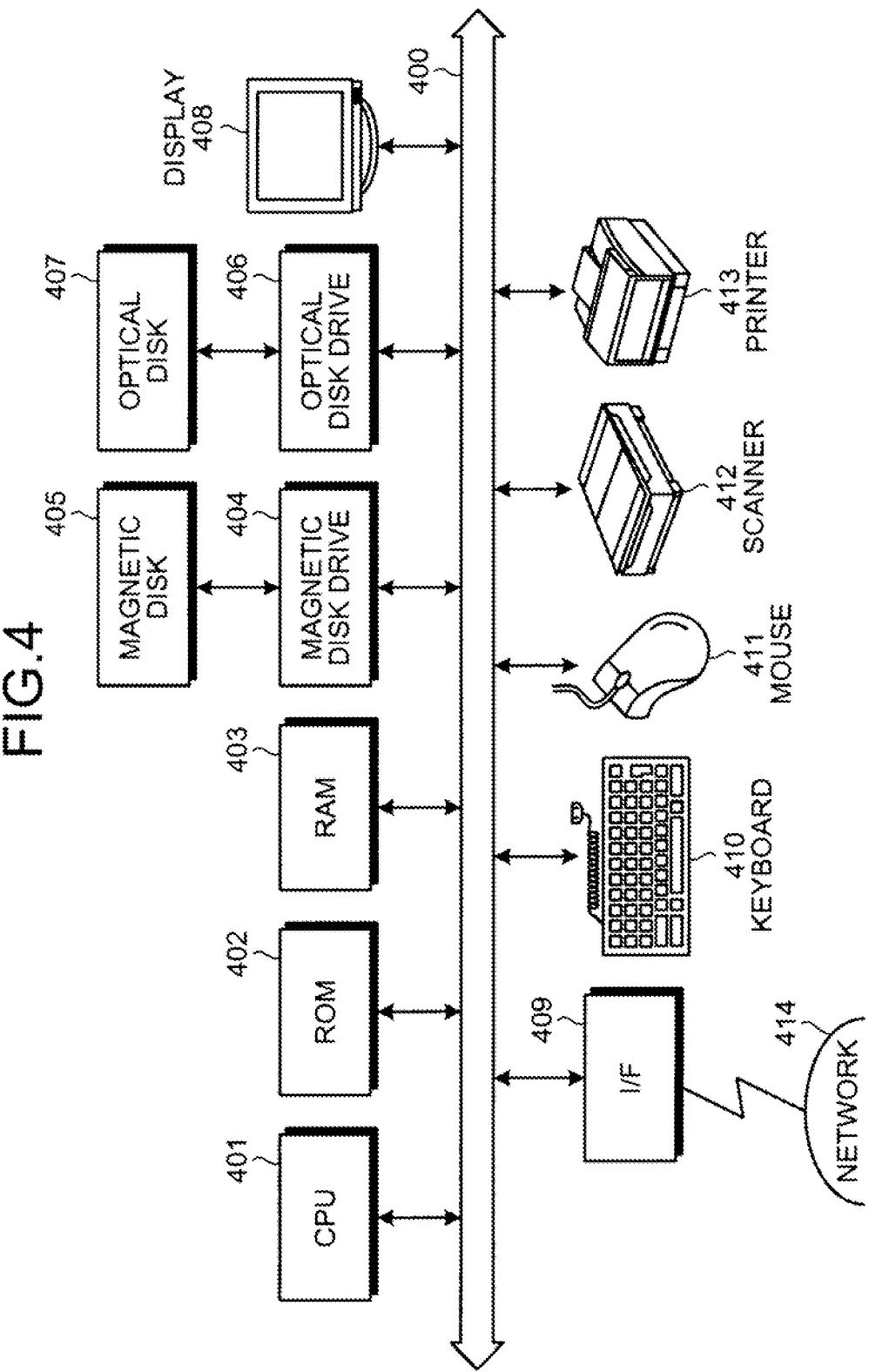
FIG. 4 is a block diagram of a hardware configuration of a computer according to the embodiment.

FIG. 4 is a block diagram of a hardware configuration of the a computer (the nodes N1 to N4, the management server M, and the clients C1 to C3) according to the present embodiment. As depicted in FIG. 4, a search apparatus has a central processing unit (CPU) 401, a read-only memory (ROM) 402, a random access memory (RAM) 403, a magnetic disk drive 404, the magnetic disk 405, an optical disk drive 406, the optical disk 407, a display 408, an interface (I/F) 409, a keyboard 410, a mouse 411, a scanner 412, and a printer 413, respectively connected by a bus 400.

The CPU 401 governs overall control of the design support apparatus. The ROM 402 stores therein programs such as a boot program. The RAM 403 is used as a work area of the CPU 401. The magnetic disk drive 404, under the control of the CPU 401, controls the reading and writing of data with respect to the magnetic disk 405. The magnetic disk 405 stores therein data written under control of the magnetic disk drive 404.

The optical disk drive 406, under the control of the CPU 401, controls the reading and writing of data with respect to the optical disk 407. The optical disk 407 stores therein data written under control of the optical disk drive 406, the data being read by a computer.

The display 408 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 408.

The I/F 409 is connected to the network NW such as a local area network (LAN), a wide area network (WAN), and the Internet through a communication line and is connected to other apparatuses through the network NW. The I/F 409 administers an internal interface with the network NW and controls the input/output of data from/to external apparatuses. For example, a modem or a LAN adaptor may be employed as the I/F 409.

The keyboard 410 includes, for example, keys for inputting letters, numerals, and various instructions and performs the input of data. Alternatively, a touch-panel-type input pad or numeric keypad, etc. may be adopted. The mouse 411 is used to move the cursor, select a region, or move and change the size of windows. A track ball or a joy stick may be adopted provided each respectively has a function similar to a pointing device.

The scanner 412 optically reads an image and takes in the image data into the design support apparatus. The scanner 412 may have an optical character reader (OCR) function as well. The printer 413 prints image data and text data. The printer 413 may be, for example, a laser printer or an ink jet printer.

A search notification processing example and a search processing example will be described. In the search notification processing, a process of giving notification of a search request that causes the nodes N1 to N4 to search for data that is targeted for retrieval (hereinafter, search data) is executed. In the search processing, processing that searches for the search data is executed by the node that receives the search request.

The computer that executes the search notification processing (e.g., the management server M or the client, hereinafter, simply "transmission source computer") transmits a search request for the search data to any one of the nodes N1 to N4. Node destinations can be identified by referring to the node list 101.

The transmission source computer specifies a node (search node) to search for search data. The node from which to search, for example, may be arbitrarily specified by the user of the transmission source computer. Further, for example, transmission source computer may specify the node in order of the node ID. Further, for example, a successful search node during the search notification processing 1-execution before current execution of the search notification processing may be specified as the node to search for the search data. Further, for example, the transmission source computer may perform search notification with respect to all of the nodes.

Figure 5:
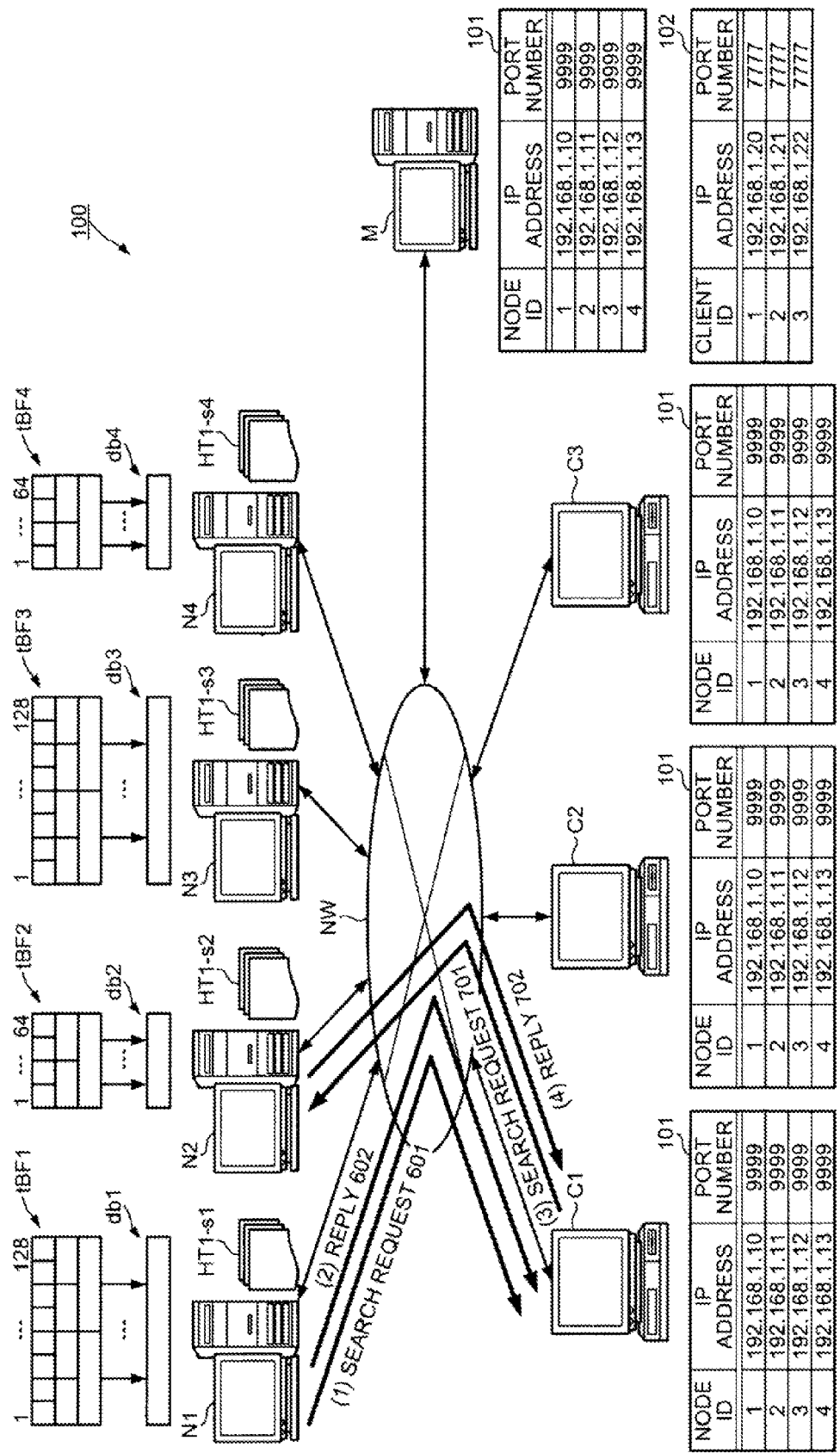
FIG. 5 is a diagram of an example of search notification processing by a transmission source computer.

FIG. 5 is a diagram of an example of the search notification processing by a transmission source computer. For example, the successful search node ID is assumed be 1. Based on the successful search node ID, the transmission source computer (in FIG. 5, client C1) selects the node N1, from among the nodes. The transmission source computer (1) transmits a search request 601 to the node N1 and waits for a reply 602 from the node N1. The transmission source computer, (2) upon receiving the reply 602 from the node N1, determines whether the search result is "positive". Upon determining that the search result is not "positive", the transmission source computer (3) in order of node ID, transmits a search request 701 to the node N2 and waits for a reply 702 from the node N2.

The transmission source computer, (4) upon receiving the reply 702 from the node N2, determines whether the search result is "positive". Upon determining that the search result is "positive", the transmission source computer outputs the search result and ends the search notification processing.

FIGS. 6 and 7 are diagrams of examples of the data structures of the search request and the reply. In FIGS. 6 and 7, section (A) depicts the search requests 601, 701 and section (B) depicts the replies 602, 702. The headers of the search requests 601, 701 depicted in section (A) store the source address/the source port number and the destination address/ the destination port number of the search requests 601, 701. In FIGS. 6 and 7, the computer assigned reference numerals C1, N1, and N2 are indicated in place of the IP addresses and port numbers.

The payloads of the search requests 601, 701 depicted in section (A) store information for fields including type and search data. For example, the type field stores "search" and the search data field stores "Dx".

The headers of the replies 602, 702 depicted in section (B) store source addresses and destination addresses that are respectively the destination address/the destination port number and the source address/the source port number of the search requests 601, 701. The payloads of the replies 602, 702 depicted in section (B) store information for a search result field. Concerning the payloads of the replies 602, 702 depicted in section (B), in the case of FIG. 6, the search result (no Dx) for the node N1 is stored (i.e., indication that the search result is negative); and in the case of FIG. 7, the search result (Dx) for the node N2 is stored. Next, an example of search processing by the node N2 will be given for a case where the transmission source computer has transmitted a search request to the node N2.

Figure 8:
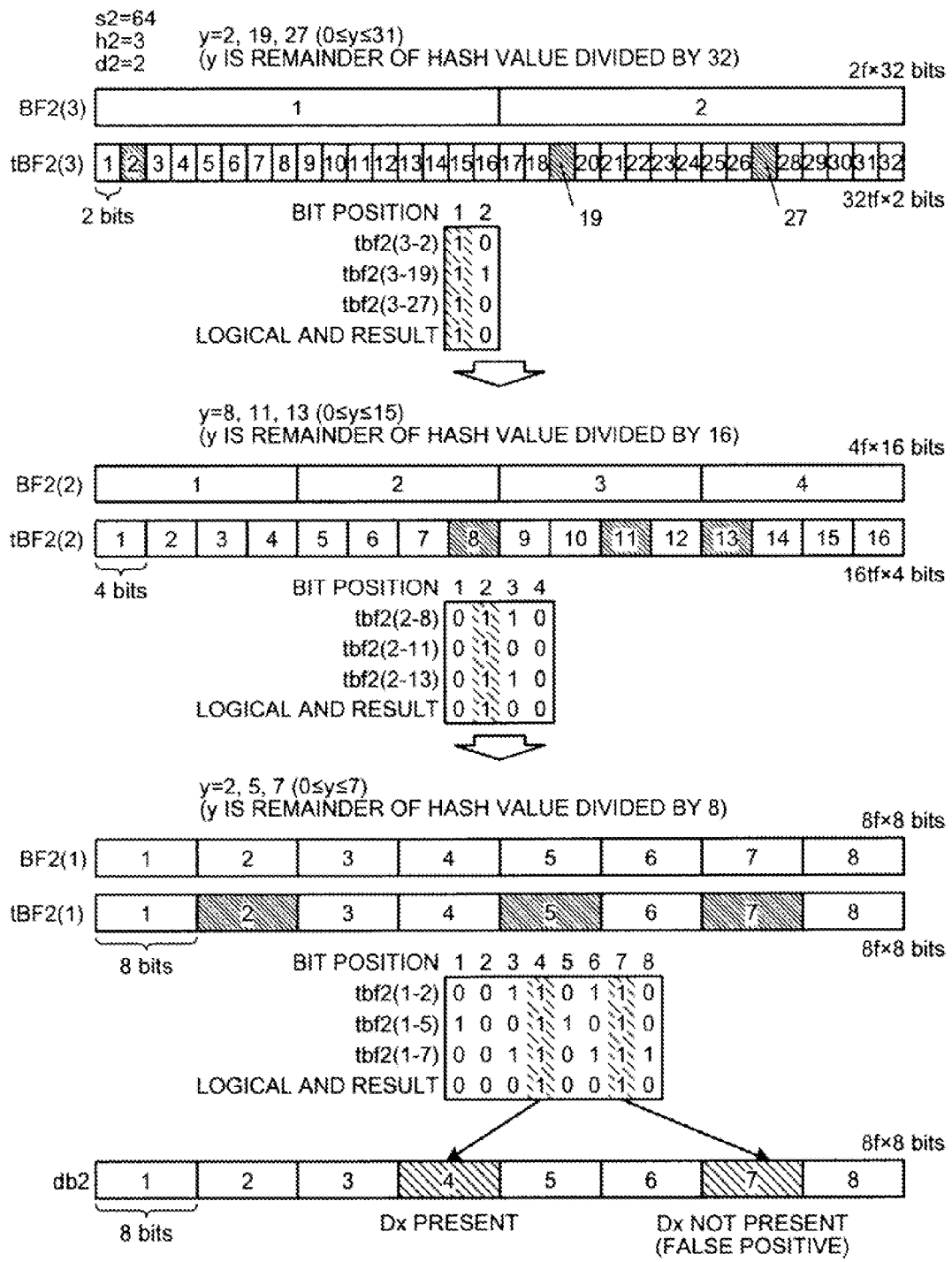
FIG. 8 is a diagram of an example of search processing by a node N2 and concerning the multilayer transposed Bloom filter tBF2.

FIG. 8 is a diagram of an example of search processing by the node N2 and concerning the multilayer transposed Bloom filter tBF2. In FIG. 8, for the sake of explanation, the total bit width s2=64, the level count h2=3 levels, and h2-th divisor d2=2.

The bit width of the Bloom filters constituting the Bloom filter row BF2(1) at the first level, which is the lowest level, is $8(=s2/d2^{h2}=64/2^3)$ bits and therefore, the transposed Bloom filter row tBF2(1) at the first level (lowest level) is constituted by the $8(=s2/d2^{h2}=64/2^3)$ transposed Bloom filters tbf2(1-1) to tbf2(1-8).

The bit width of the Bloom filters constituting the transposed Bloom filter row tBF2(2) at the second level is $16(=s2/d2^{h2}=64/2^2)$ bits and therefore, the transposed Bloom filter row tBF2(2) at the second level is constituted by the $16(=s2/d2^{h2}=64/2^2)$ transposed Bloom filters tbf2(2-1) to tbf2(2-16).

The bit width of Bloom filters constituting the Bloom filter row BF2(3) at the third level (highest level) is $32(=s2/d2^{h2}=64/2^1)$ bits and therefore, the transposed Bloom filter row tBF2(3) at the third level (highest level) is constituted by the $32(=s2/d2^{h2}=64/2^1)$ transposed Bloom filters tbf2(3-1) to tbf2(3-32).

In FIG. 8, for the sake of explanation and for comparison, transposed Bloom filter row tBF2(1) to tBF2(3) and the Bloom filter row BF2(1) to BF2(3) before transposition are indicated.

The node N2 obtains the values "2", "19", and "27", which are the remainders obtained by dividing each of the 3 hash values obtained from hash functions H1( ) to H3( ) related to the search data Dx, by the third-level transposed Bloom filter count of 32.

The node N2 identifies from the third-level transposed Bloom filter row tBF2(3), a transposed Bloom filter that is to be filtered. For example, the node N2 identifies the transposed Bloom filters tbf2(3-2), tbf2(3-19), tbf2(3-27) at the positions matching the remainders (if the remainder is 0, the tail position). The node N2 performs logical AND operation with respect to the bit strings {10}, {11}, {10} of the identified transposed Bloom filters tbf2(3-2), tbf2(3-19), tbf2(3-27). The AND result is {10}.

If "1" is not included in the AND result, the node N2 determines that the search data Dx is not present in the data block set db2. On the other hand, if "1" is included in the AND result, since the search data Dx may be registered, the node N2 transitions 1 level downward.

At the second level as well, the node N2 obtains the values "8", "11", and "13", which are the remainders obtained by dividing each of the 3 hash values related to the search data Dx, by the second-level transposed Bloom filter count of 16.

The node N2 identifies from the second-level transposed Bloom filter row tBF2(2), a transposed Bloom filter that is to be filtered. For example, the node N2 identifies the transposed Bloom filters tbf2(2-8), tbf2(2-11), tbf2(2-13) at the positions matching the remainders (if the remainder is 0, the tail position). The node N2 performs logical AND operation with respect to the bit strings {0110}, {0100}, {0110} of the identified transposed Bloom filters tbf2(2-8), tbf2(2-11), tbf2(2-13). The AND result is {0100}.

If "1" is not included in the AND result, the node N2 determines that the search data Dx is not present in the data block set db2. On the other hand, if "1" is included in the AND result, since the search data Dx may be registered, the node N2 transitions 1 level downward.

At the first level (lowest level) as well, the node N2 obtains the values "2", "5", and "7", which are the remainders obtained by dividing the 3 hash values related to the search data Dx, by the first-level transposed Bloom filter count of 8.

The node N2 identifies from the first-level transposed Bloom filter row tBF2(1), transposed Bloom filters that are to be filtered. For example, the node N2 identifies the transposed Bloom filters tbf2(1-2), tbf2(1-5), tbf2(1-7) at the positions matching the remainders (if the remainder is 0, the tail position). The node N2 performs logical AND operation with respect to the bit strings {00110110}, {10011010}, {00110111} of the identified transposed Bloom filters tbf2 (1-2), tbf2(1-5), tbf2(1-7). The AND result is {00010010}.

Since no further levels are present, by a false positive, the search data Dx may be present in the data blocks db2-4, db2-7 corresponding to the bit positions 4, 7 in the AND result {00010010}, having a value of "1".

In this example, the hash value of the hash function H1( ) is used as a key to search the hash tables HT2-4, HT2-7, whereby the data block db2-4 is hit and the data block db2-7 is not hit. Thus, it becomes clear that the search data Dx is registered in the data block db2-4. The node N2 transmits the reply 702 indicating the search result (positive), thereby ending the search processing.

By such a procedure, a node Ni can search for data more quickly by using the multilayer transposed Bloom filter tBFi as compared to the multilayer Bloom filter BFi.

Figure 9:
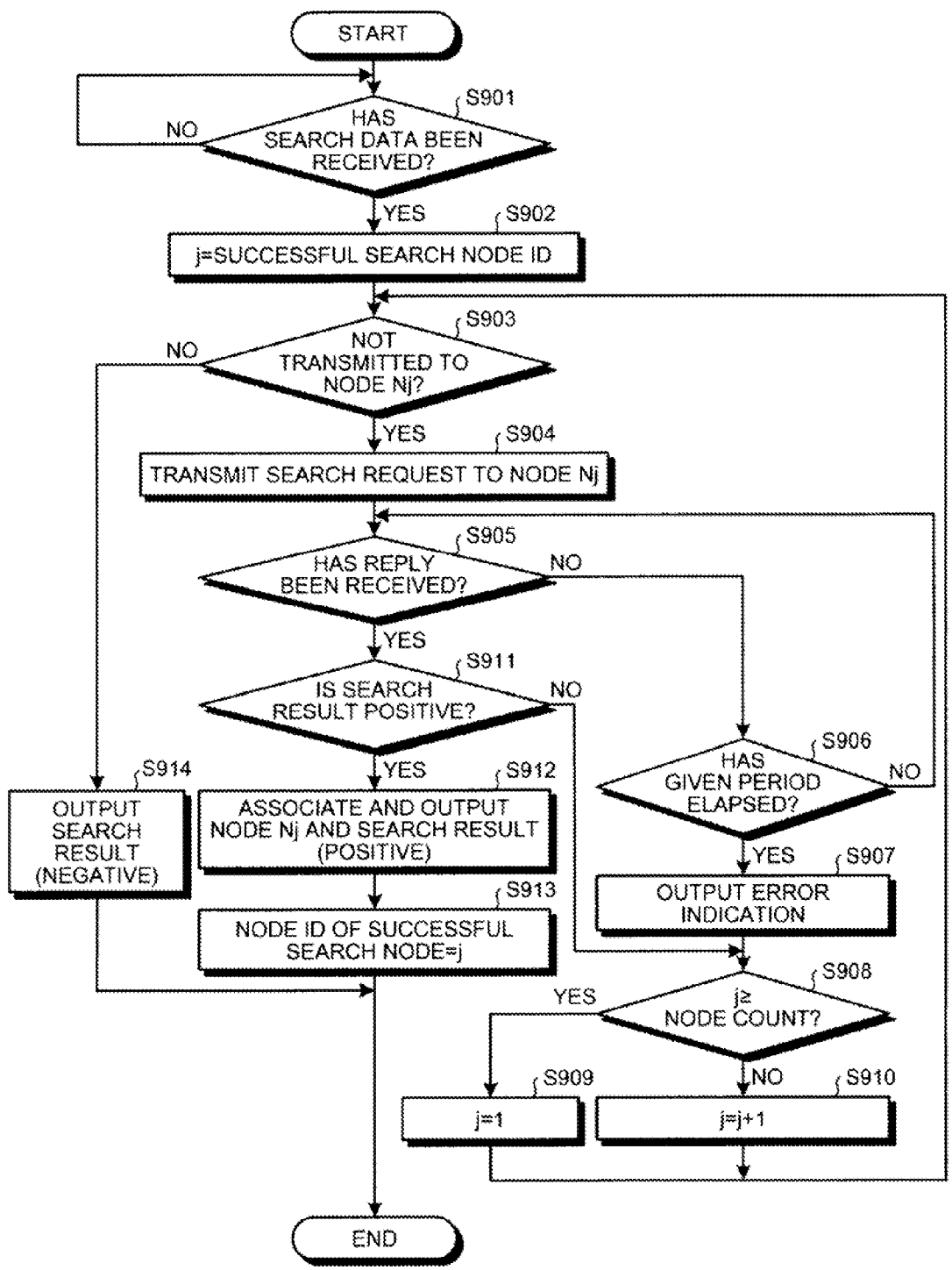
FIG. 9 is a flowchart of an example of search notification processing by the transmission source computer.

FIG. 9 is a flowchart of an example of the search notification processing by the transmission source computer. The transmission source computer determines whether search data has been received (step S901). If search data has not been received (step S901: NO), the transmission source computer returns to step S901. If search data has been received (step S901: YES), the transmission source computer sets j=immediately previous successful search node ID (step S902). Thus, from among the node group, searching can be performed preferentially from a node that successfully performed a search during the search executed 1-execution before the current search.

The transmission source computer determines whether a search request has not yet been transmitted to the node Nj (step S903). Determination of whether a search request has been transmitted to the node Nj enables the selection of a node that has not yet been selected to be selected from among the node group. If a search request has not yet been transmitted to the node Nj (step S903: YES), the transmission source computer transmits a search request to the node Nj (step S904), and determines whether a reply has been received (step S905).

If a reply has not been received (step S905: NO), the transmission source computer determines whether a given period of time has elapsed since the transmission of the search request (step S906). If the given period of time has not elapsed (step S906: NO), the transmission source computer returns to step S905. On the other hand, if the given period of time has elapsed (step S906: YES), the transmission source computer outputs indication that an error has occurred (step S907). For example, the transmission source computer displays on the display 408, indication that a search by the node Nj could not be performed.

The transmission source computer determines whether j≥total node count is true (step S908). If j≥total node count is true (step S908: YES), the transmission source computer sets j=1 (step S909), and returns to step S903. If j≥total node count is not true (step S908: NO), the transmission source computer sets j=j+1 (step S910), and returns to step S903.

If a reply has been received (step S905: YES), the transmission source computer determines whether the search result is positive (step S911). If the search result is positive (step S911: YES), the transmission source computer associates and outputs the node Nj and the search result (positive) (step S912), sets the node ID of the successful search node=j (step S913), and ends the search notification processing. For example, the transmission source computer may display on the display 408, the result of associating the node Nj and the block number. For example, the transmission source computer may store to a storage device such as the ROM 402, the RAM 403, the magnetic disk 405, and the optical disk 407, the node Nj as the node ID of the node to which the previous data was added. If the search result is negative (step S911: NO), the transmission source computer transitions to step S908.

If a search request has been transmitted to the node Nj (step S903: NO), the transmission source computer outputs a search result (negative) (step S914), and ends the search notification processing. For example, the transmission source computer displays on the display 408, indication that the search data could not be found at any of the nodes.

By preferentially selecting the node ID of previous successful search node and transmitting a search request, a heuristic of reading in the same order as that of the addition of the data Dx can be used, enabling increased search speed.

Figure 10:
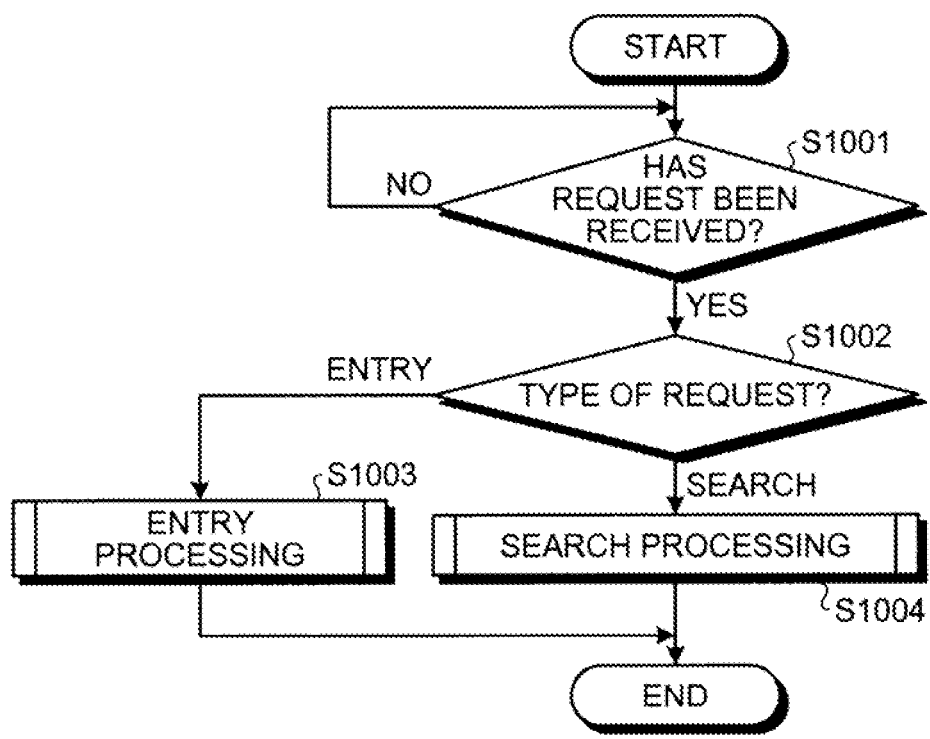
FIG. 10 is a flowchart of search/entry processing by a node Ni.

FIG. 10 is a flowchart of search/entry processing by a node Ni. The processing depicted in FIG. 10 is processing executed by each node among the nodes (the nodes N1 to N4).

The node Ni determines whether a request has been received (step S1001). If a request has not been received (step S1001: NO), the node Ni returns to step S1001. On the other hand if a request has been received (step S1001: YES), the node Ni determines the type of the received request (step S1002).

If the type of the received request is entry (step S1002: entry), the node Ni executes entry processing (step S1003), and ends the processing. If the type of the received request is search (step S1002: search), the node Ni executes search processing (step S1004), and ends the processing.

Figure 11:
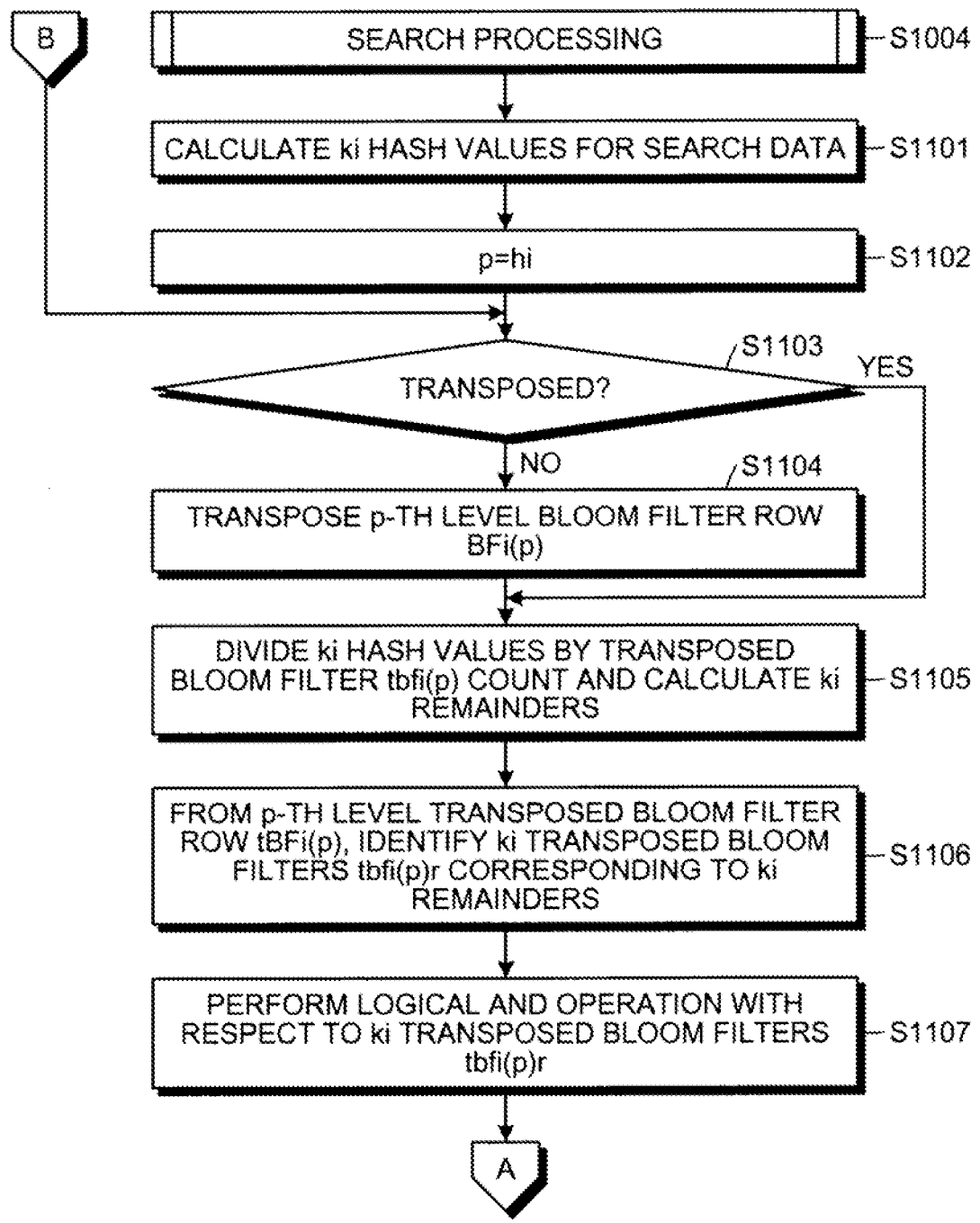
FIGS. 11 and 12 are flowcharts of search processing (step S1004) depicted in FIG. 10.
Figure 12:
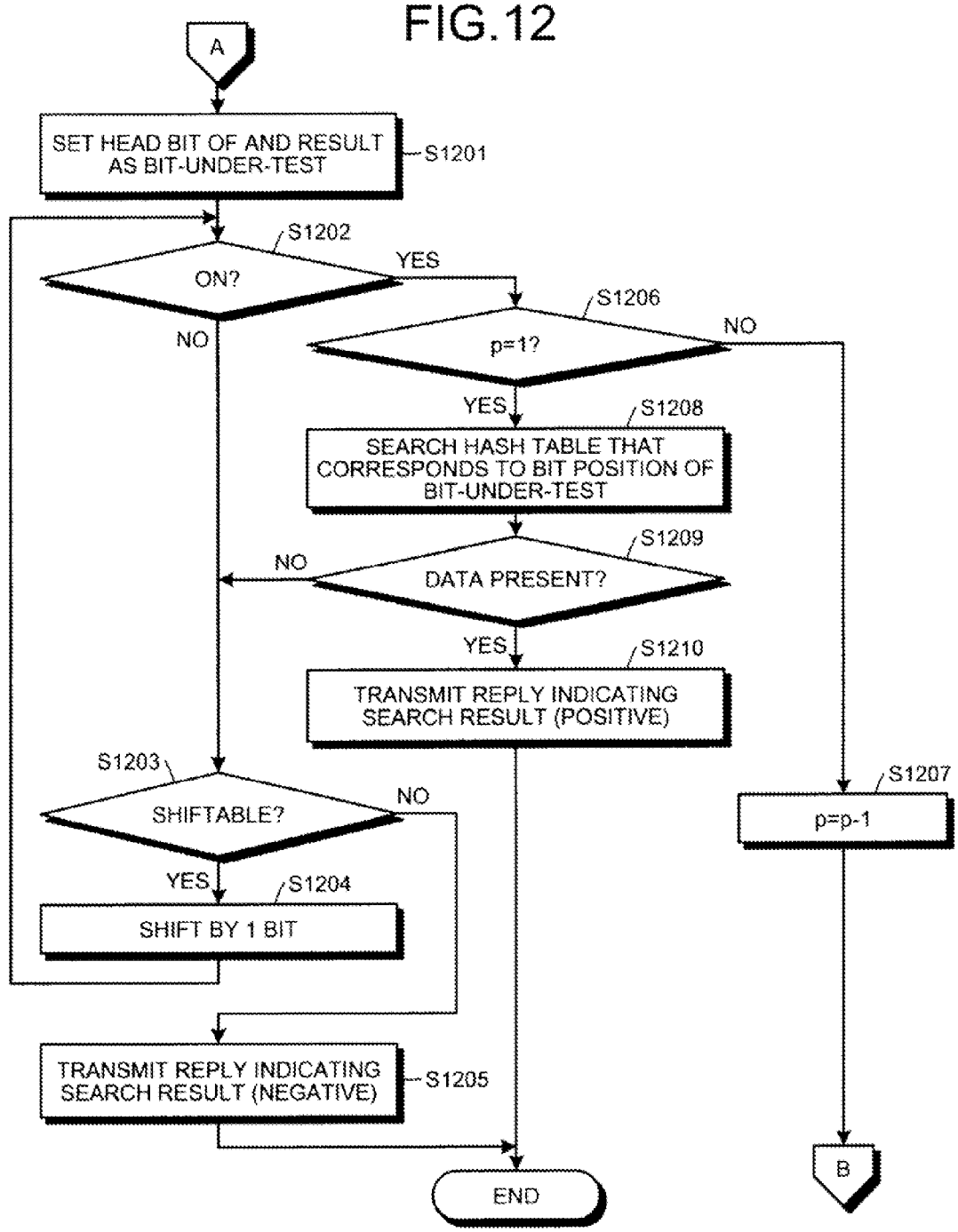

FIGS. 11 and 12 are flowcharts of the search processing (step S1004) depicted in FIG. 10. The Bloom filter used by the node Ni may be the multilayer transposed Bloom filter tBFi, which has been completely transposed, or the multilayer Bloom filter BFi. If the multilayer Bloom filter BFi is used, transposition processing is performed each time a non-transposed Bloom filter is identified.

In other words, the multilayer transposed Bloom filter tBFi is constructed while a search is performed. In FIGS. 11 and 12, an example where the multilayer transposed Bloom filter tBFi is constructed as a search is performed is described. If collective transposition has been completed, determination of whether transposition has been completed (step S1103) and transposition processing (step S1104) may be omitted.

As depicted in FIG. 11, the node Ni calculates ki hash values by substituting the search data Dx into ki types of hash functions (step S1101). The node Ni sets p=hi, i.e., sets a level count p to the highest level count hi (step S1102), and determines whether the p-th level Bloom filter row BFi(p) has been transposed (step S1103). If the p-th level Bloom filter row BFi(p) has been transposed (step S1103: YES), the node Ni transitions to step S1105. On the other hand, if the p-th level Bloom filter row BFi(p) has not been transposed (step S1103: NO), the node Ni transposes the p-th level Bloom filter row BFi(p) (step S1104), and transitions to step S1105.

At step S1105, the node Ni divides the ki hash values by the transposed Bloom filter tbfi(p) count to calculate ki remainders (step S1105). From the p-th level transposed Bloom filter row tBFi(p), the node Ni identifies ki transposed Bloom filters tbfi(p)r that correspond to the ki remainders (step S1106).

The node Ni performs logical AND operation with respect to the ki transposed Bloom filters tbfi(p)r (step S1107), and transitions to step S1201 depicted in FIG. 12.

In FIG. 12, the node Ni sets the head bit of the AND result as the bit-under-test (step S1201), and determines whether the bit-under-test is ON (step S1202). If the bit-under-test is not ON (step S1202: NO), the node Ni determines whether the bit-under-test can be shifted (step S1203). For example, the node Ni determines whether the bit-under-test is the tail bit.

If the bit-under-test can be shifted (step S1203: YES), the node Ni shifts the bit-under-test 1 bit toward the tail (step S1204), and returns to step S1202. On the other hand, at step S1203, if the bit-under-test cannot be shifted (step S1203: NO), the node Ni determines the search result as (negative) and transmits a reply indicating the search result (negative) (step S1205), thereby ending the processing in the case of the search result being negative.

At step S1202, if the bit-under-test is ON (step S1202: YES), the node Ni determines whether the current level count p is p=1 (step S1206). If the current level count p=1 is not true (step S1206: NO), the node Ni decrements p (step S1207), and returns to step S1103.

On the other hand, if the current level count p=1 is true (step S1206: YES), the node Ni searches the hash table that corresponds to the bit position of the bit-under-test (step S1208). The node Ni determines whether the search data Dx is present (step S1209).

If the search data Dx is not present (step S1209: NO), the node Ni returns to step S1203 and determines whether the bit-under-test can be shifted. On the other hand, if the search data Dx is present (step S1209: YES), the node Ni transmits a reply indicating the search result (positive) (step S1210). The node Ni extracts, as necessary, relevant data and transmits the extracted data as a search result to the transmission source computer, thereby ending the processing in the case of the search result being positive.

Entry notification processing will be described. In the entry notification processing, processing for giving notification of an entry request causing data (registration data) to be registered at any one of the nodes N1 to N4 is executed. In the entry processing, the node that receives the entry request executes entry processing for registering the registration data and further executes entry processing with respect to the multilayer transposed Bloom filter tBF of the node.

The computer (e.g., the management server M or a client, and hereinafter "transmission source computer" that executes the entry notification processing transmits an entry request for the registration data to any one of the nodes N1 to N4. The node list 101 can be referred to and thereby identify the addresses of the nodes. An example of an entry request is described hereinafter. A node (registration destination) to which the registration data is to be entered is specified. The registration destination may be any one of the nodes N1 to N4. The node to which registration is to be performed, for example, may be arbitrarily specified by the user of the transmission source computer. Further, configuration may be such that a node is preliminarily specified according to the available capacity of each node. The available capacity of each node is assumed to be periodically reported to the management server M by the node or reported in response to a request from the management server M; or broadcasted to a client from the management server M.

Figure 13:
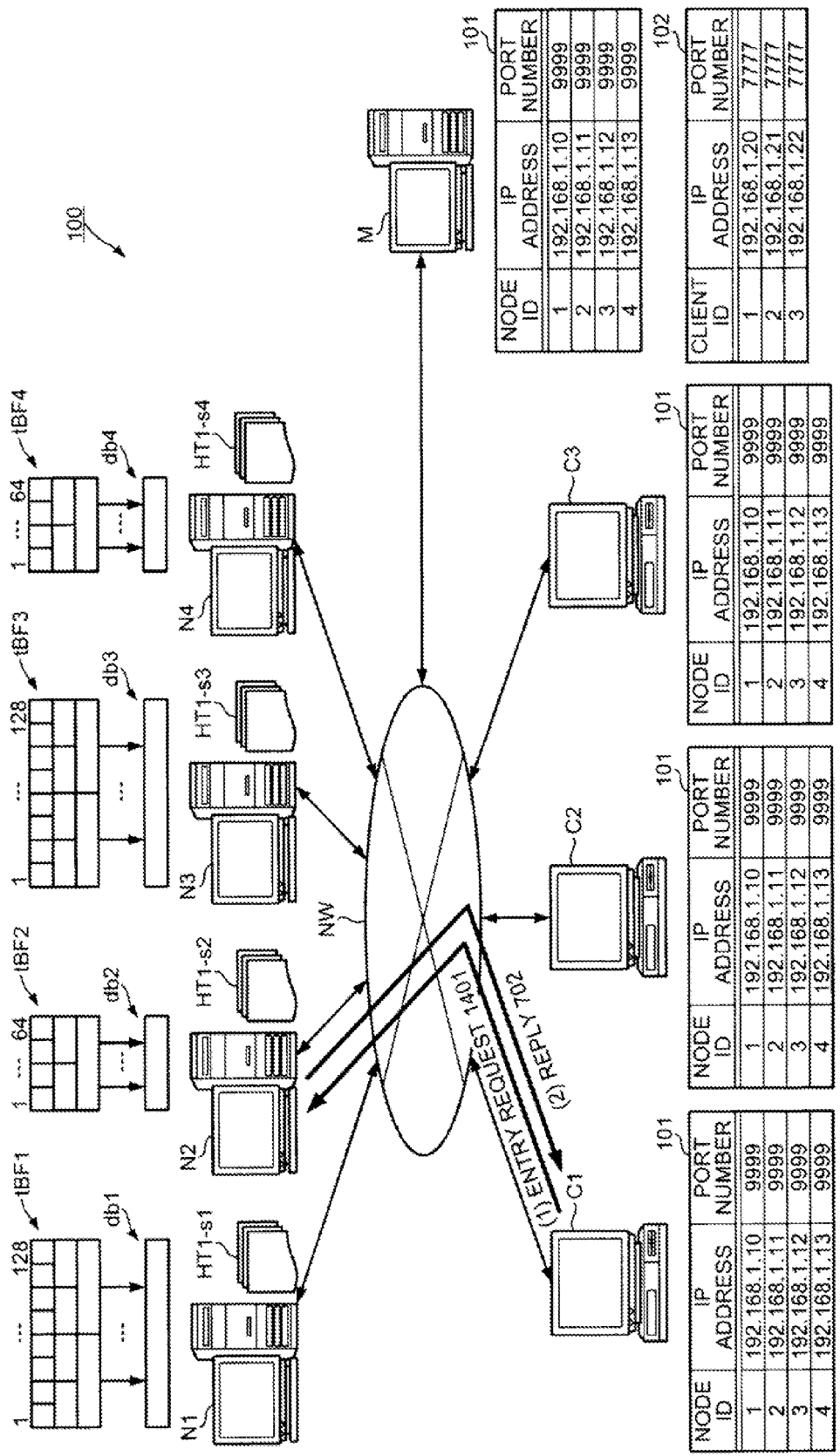
FIG. 13 is a diagram of an example of entry notification processing by the transmission source computer.

FIG. 13 is a diagram of an example of the entry notification processing by the transmission source computer. The transmission source computer (in FIG. 13, the client C1) (1) transmits to the node N2, an entry request 1401 for registration data and waits for a reply 1402 from the node N2. The transmission source computer (2) upon receiving the reply 1402 from the node N2, determines whether entry of the registration data was successful. Upon determining that entry was successful, the transmission source computer ends the entry notification processing.

FIG. 14 is a diagram of an example of the data structure of an entry request and a reply. In FIG. 14, section (A) depicts the entry request 1401 and section (B) depicts the reply 1402. The header of the entry request 1401 depicted in section (A) stores the source address/source port number and the destination address/destination port number of the entry request 1401. In FIG. 14, the computer assigned reference numerals C1 and N2 are indicated in place of the IP addresses and port numbers.

The payload of the entry request 1401 depicted in section (A) stores information for fields including type and registration data. For example, the type field stores "registration" and the registration data field stores "Dx".

The header of the reply 1402 depicted in section (B) stores a source address and a destination address that are respectively the destination address/destination port number and the source address/source port number of the entry request 1401. The payload of the reply 1402 depicted in section (B) stores information for a block number field. For example, the block number field stores "4", indicating that "Dx" is stored in the data block db2-4 of the multilayer transposed Bloom filter tBF2. An example of the entry processing by the node N2 that has received the entry request 1401 will be described.

Figure 15:
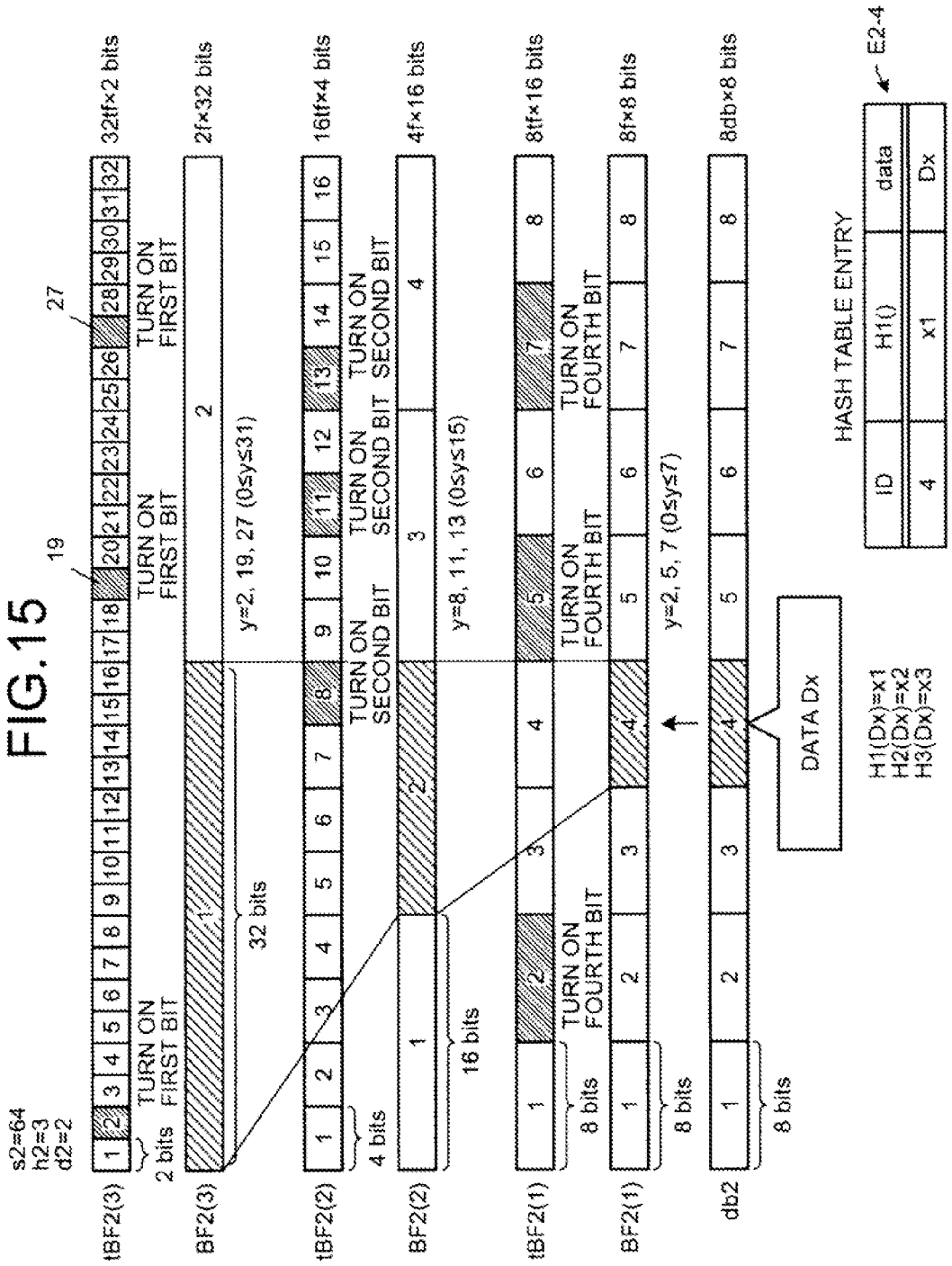
FIG. 15 is a diagram of an example of entry processing performed by the node N2 with respect to the multilayer transposed Bloom filter tBF2.

FIG. 15 is a diagram of an example of entry processing performed by the node N2 with respect to the multilayer transposed Bloom filter tBF2. The node N2 receives an entry request from the transmission source computer. At the multilayer transposed Bloom filter tBF2, the number of types of hash functions (hash function type count k2) into which the data D (which is to be registered) is substituted is assumed to be k2=3. In this example, hash functions H1( ) H2( ) and H3( ) are assumed. Further, the hash function having the hash table to which registration is to be performed is assumed to be H1( ).

The data Dx is assumed to be registered in the data block db2-4 in the data block set db2. The hash values obtained when the data DX is substituted in the hash functions H1( ) H2( ) and H3( ) are, for example, H1(Dx)=x1, H2(Dx)=x2, and H3(Dx)=x3.

In the entry processing of the multilayer transposed Bloom filter tBF, although the identified bit in the transposed Bloom filter tbf2(p) that is to be updated is turned ON, if the bit is already ON, the bit remains as is.

In this example, the node N2 creates a hash table entry E2-4 for the hash table HT2-4 of block number 4 of the data block db2-4, which is the registration destination. The node N2 adds the created hash table entry E2-4 to the hash table HT2-4.

The node N2 transitions to entry processing for the first level. The node N2 identifies a transposed Bloom filter tbf2(1) to be updated from among first level transposed Bloom filter row tBF2(1). For example, the node N2 divides each of the hash values x1 to x3 by the filter count of the first level transposed Bloom filter row tBF2(1) 8 to calculate the remainders. The remainder for the hash value x1 is assumed to be "2"; the remainder for the hash value x2 is assumed to be "5", and the remainder for the hash value x3 is assumed to be "7". Therefore, the transposed Bloom filters tbf2(1) that are to be updated at the first level are the transposed Bloom filters tbf2(1-2), tbf2(1-5), and tbf2(1-7).

At the lowest level, the bit position corresponding to the block number 4 of the data block db2-4 to which registration is to be performed is assumed to be the bit to be updated. Therefore, the node N2 turns on the fourth bit from the head of the transposed Bloom filter that is to be updated, thereby ending the entry processing for the first level transposed Bloom filter row tBF2(1).

The node N2 transitions to entry processing for the second level. The node N2 identifies a transposed Bloom filter tbf2(2) that is to be updated, from among the second level transposed Bloom filter row tBF2(2). For example, the node N2 divides each of the hash values x1 to x3 by the filter count of the second transposed Bloom filter row tBF2(2) 16 to calculate the remainders. The remainder for the hash value x1 is assumed to be "8", the remainder for the hash value x2 is assumed to be "11", and the remainder for the hash value x3 is assumed to be "13". Therefore, the transposed Bloom filters tbf2(2) that are to be updated at the second level are the transposed Bloom filters tbf2(2-8), tbf2(2-11), and tbf2(2-13).

The bit at which bit position is to be turned ON in the transposed Bloom filters tbf2(2-8), tbf2(2-11), and tbf2(2-13) will be described. In the multilayer Bloom filter BF2 before transposition, the divisor is assumed to be d2 and each Bloom filter row BF2(p) is divided into $n2(=d2^{[h2-(p-1)]})$ bit strings, whereby the bit width of each Bloom filter row BF2(p) becomes m2(=s2/n2) bits.

In the multilayer transposed Bloom filter tBF2, the filter count n2 and the bit width m2 are interchanged. Consequently, in the multilayer transposed Bloom filter tBF2, rather than the filter position number # of the Bloom filter bf2((p−1)−#) that is to be updated at the (p−1)-th level, the bit position to be updated at the (p−1)-th level is divided by the divisor d2 and rounded up.

In the case of the second level, the bit to be updated at the first level is the fourth bit from the head and the fourth bits of the transposed Bloom filters tbf2(1-2), tbf2(1-5), and tbf2(1-7) are ON. Therefore, the second level bit to be updated is d2=2 and consequently, the 4/d2=the second bit from the head is the bit to be updated. In the present example, the second bits from the heads of the transposed Bloom filters tbf2(2-8), tbf2(2-11), and tbf2(2-13) are ON, whereby the entry processing executed by the node N2 with respect to the second level transposed Bloom filter row tBF2(2) ends.

The node N2 transitions to entry processing for the third level. The node N2 identifies a transposed Bloom filter tbf2(3) that is to be updated from among the third level transposed Bloom filter row tBF2(3). For example, the node N2 divides each of the hash values x1 to x3 by the filter count of the third level transposed Bloom filter row tBF2(3) to calculate the remainders. The remainder for the hash value x1 is assumed to be "2", the remainder for the hash value x2 is assumed to be "19", and the remainder for the hash value x3 is assumed to be "27". Therefore, the transposed Bloom filter tbf2(3) that are to be updated at the third level are the transposed Bloom filters tbf2(3-2), tbf2(3-19), and tbf2(3-27).

The bits to be updated in the transposed Bloom filters tbf2(3-2), tbf2(3-19), and tbf2(3-27) are determined. Similar to the second level, rather than the filter position number # of the Bloom filter bf2((p−1)−#) that is to be updated at the (p−1)-th level, the bit position of the bit to be updated at the (p−1)-th level is divided by the divisor d2 and rounded up.

In the case of the third level, the bit to be updated at the second level (previous level) is the second bit from the head and the second bits of the transposed Bloom filters tbf2(2-8), tbf2(2-11), and tbf2(2-13) are turned ON. Therefore, the third level bit to be updated is d2=2 and consequently, the 2/d2=the first bit from the head is the bit to be updated. In the present example, the head bits of the transposed Bloom filters tbf2(3-2), tbf2(3-19), and tbf2(3-27) are ON, whereby the entry processing for the third level transposed Bloom filter row tBF2(3) ends. The node N2 transmits a reply to the transmission source computer and thereby, ends the entry processing.

Figure 16:
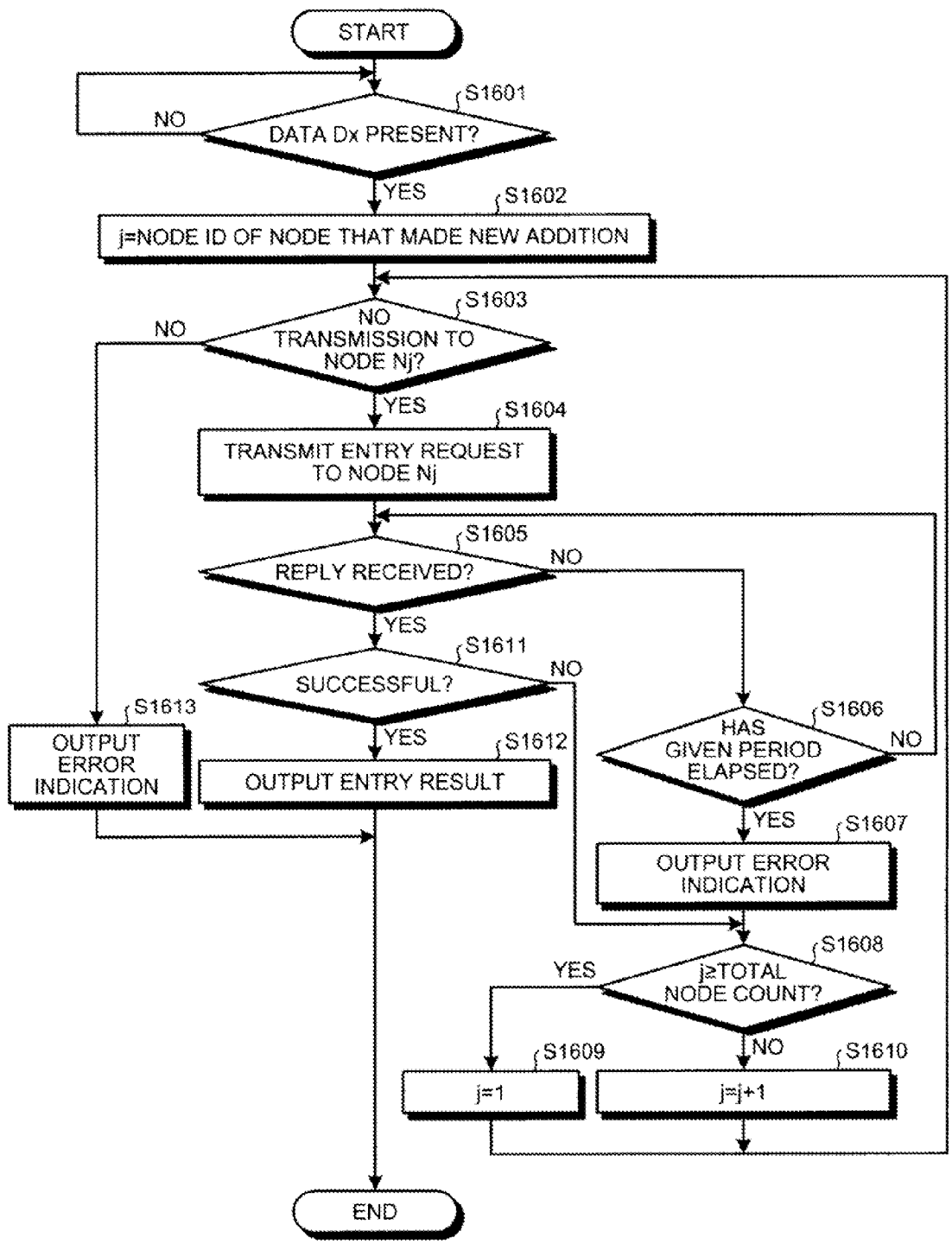
FIG. 16 is a flowchart of one example of entry notification processing by the transmission source computer.

FIG. 16 is a flowchart of one example of the entry notification processing by the transmission source computer. The transmission source computer determines whether data Dx is present (step S1601). If data Dx is not present (step S1601: NO), the transmission source computer returns to step S1601. If data Dx is present (step S1601: YES), the transmission source computer sets j=node ID of the node that added the immediately previous data (step S1602), and determines whether an entry request has not yet been transmitted to the node Nj (step S1603).

If an entry request has not yet been transmitted to the node Nj (step S1603: YES), the transmission source computer transmits an entry request to the node Nj (step S1604), and determines whether a reply has been received (step S1605).

If a reply has not been received (step S1605: NO), the transmission source computer determines whether a given period has elapsed since the transmission of the entry request (step S1606). If the given period has not elapsed (step S1606: NO), the transmission source computer returns to step S1605. On the other hand, if the given period has elapsed (step S1606: YES), the transmission source computer outputs indication that an error has occurred (step S1607). The transmission source computer displays on the display 408, indication that data entry could not be performed by the node Nj.

The transmission source computer determines whether j≥total node count is true (step S1608). If j≥total node count is true (step S1608: YES), the transmission source computer sets j=1 (step S1609), and returns to step S1603. If j≥total node count is not true (step S1608: NO), the transmission source computer sets j=j+1 (step S1610), and returns to step S1603.

If a reply has been received (step S1605: YES), the transmission source computer determines whether entry was successful (step S1611). If entry by the node Nj is successful (step S1611: YES), the transmission source computer outputs an entry result (step S1612), ending the processing. For example, the node Nj is stored to a storage device such as the ROM 402, the RAM 403, the magnetic disk 405, and the optical disk 407, as the node ID of the node that added the immediately previous data. Further, for example, indication that the node Nj performed entry may be displayed on the display 408. If entry was not successful (step S1611: NO), the transmission source computer transitions to step S1608.

If an entry request has been transmitted to the node Nj (step S1603: NO), the transmission source computer outputs indication that an error has occurred (step S1613), ending the processing. For example, the transmission source computer displays on the display 408, indication that entry could not be performed at any of the nodes.

Figure 17:
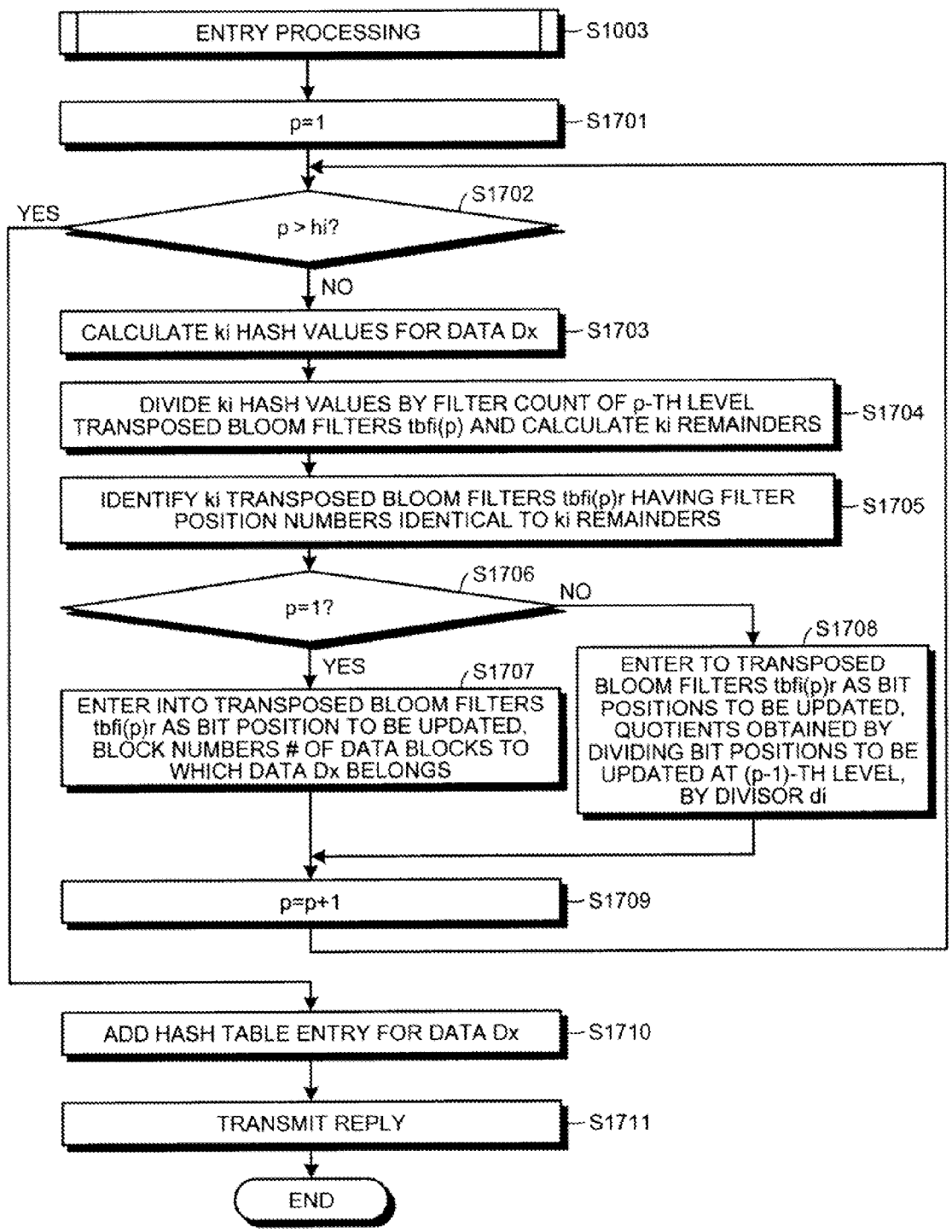
FIG. 17 is a flowchart of the entry processing (step S1003) depicted in FIG. 10.

FIG. 17 is a flowchart of the entry processing (step S1003) depicted in FIG. 10. The node Ni sets the level count p to p=1 (step S1701), and determines whether p>hi (where, hi is the highest level of the multilayer transposed Bloom filter tBFi) is true (step S1702). If p>hi is not true (step S1702: NO), the node Ni uses ki types of hash functions and calculates ki hash values for data Dx (step S1703).

The node Ni divides each of the ki hash values by the filter count of the p-th level transposed Bloom filters tbfi(p) to calculate ki remainders (step S1704). The node Ni identifies ki transposed Bloom filters tbfi(p)r having filter position numbers identical to the ki remainders (step S1705).

The node Ni determines whether p=1 is true (step S1706). If p=1 is true (step S1706: YES), the node Ni enters into the identified ki transposed Bloom filters tbfi(p)r, the block numbers # of the data blocks dbi-# to which data Dx belongs (step S1707). In other words, the block numbers # of the data blocks db# to which data Dx belongs are set as the bit positions of the bits to be updated and the bits at the bit positions to be updated # in the identified ki transposed Bloom filters tbfi(p)r are turned ON, and the Node Ni transitions to step S1709.

At step S1706, if p≠1 is true (step S1706: NO), the node Ni enters to the identified ki transposed Bloom filters tbfi(p)r, the quotients (rounded up) obtained by dividing the bit positions of the bits to be updated at the (p−1)-th level of data Dx, by the divisor di (step S1708). In other words, the bit positions to be updated at the (p−1)-th level of data Dx are divided by the divisor di, the quotients (rounded up) are set as the bit positions to be updated, and the bits at the bit positions to be updated in the identified ki transposed Bloom filters tbfi(p)r are turned ON. The node Ni transitions to step S1709.

At step S1709, the node Ni increments the level count p (step S1709), and returns to step S1702. Thus, from the lowest level to the highest level, the bits to be updated can be turned ON.

At step S1702, if p>hi is true (step S1702: YES), the node Ni adds a hash table entry for data Dx (step S1710). The node Ni transmits a reply to the transmission source computer (step S1711), and ends the entry processing for the multilayer transposed Bloom filter tBFi.

By such a procedure, the node Ni can cause data to be entered to the multilayer transposed Bloom filter tBFi. In other words, even if data is registered after transposition, entries can be made to the multilayer transposed Bloom filter tBFi, without having to restore the multilayer Bloom filter BFi from the multilayer transposed Bloom filter tBFi. Therefore, meaningless processing of restoring the multilayer Bloom filter BFi from a transposed state is eliminated, enabling search efficiency to be improved.

Figure 18:
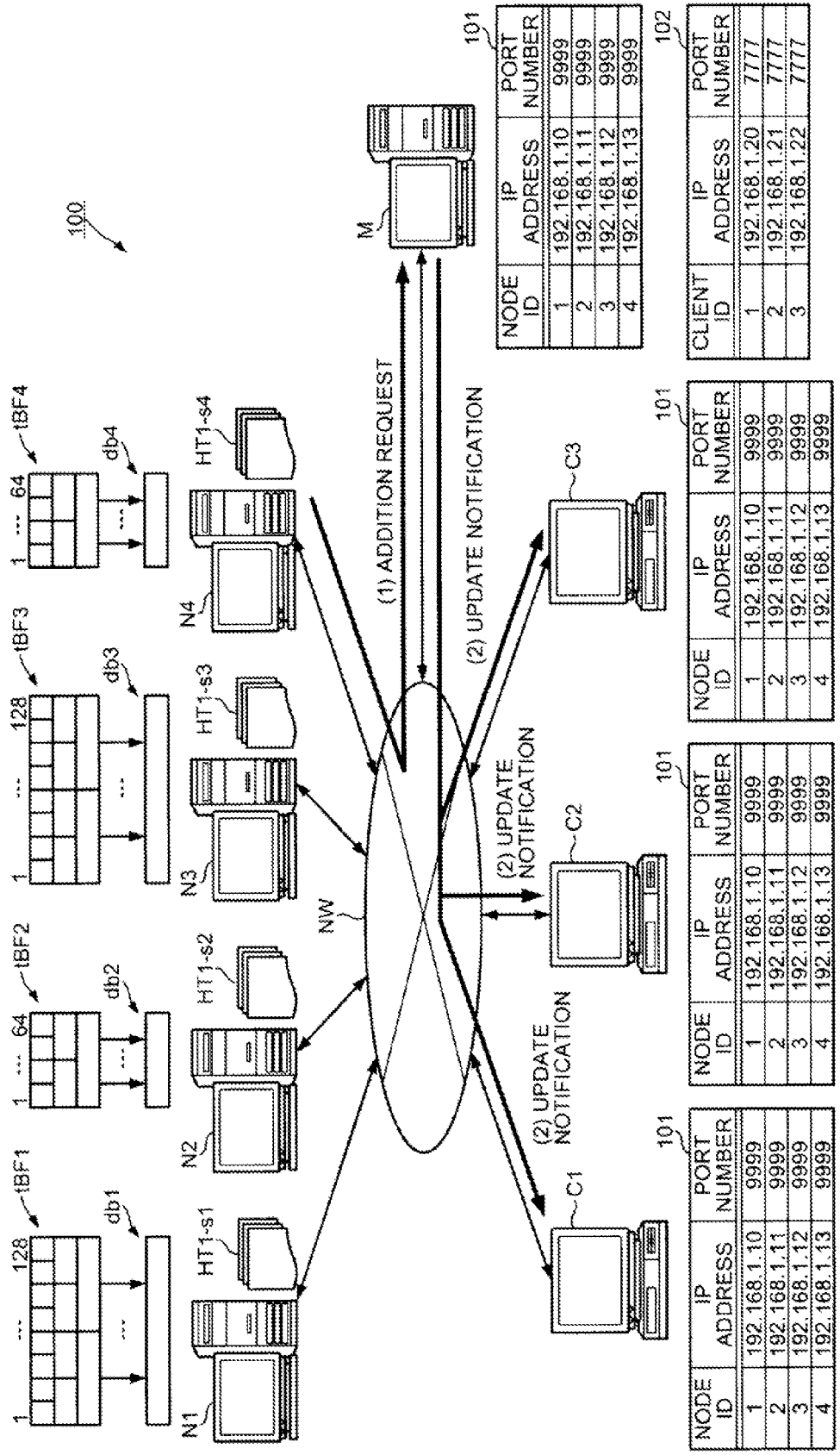
FIG. 18 is a diagram of an example of node addition.

With reference to FIG. 18, an example where a node is newly added to the search system 100 will be described.

FIG. 18 is a diagram of an example of node addition. Here, an example where a node N5 is added to the search system 100 will be described. The hardware configuration of the node N5 is, for example, is identical to the computer hardware configuration depicted in FIG. 4.

The node N5 (1) transmits an addition request to the management server M. The IP address and the port number of the management server M are specified by the registrant of the node N5. The management server M, upon receiving the addition request from the node N5, updates the node list 101 by entering into the node list 101, information related to the node ID, the IP address, and the port number of the new node N5. The management server M (2) refers to the client list 102 and broadcasts the update of the node list 101. Each client, upon receiving update notification from the management server M, updates the node list 101.

FIG. 19 is a flowchart of an example of node addition processing performed by the management server M. The management server M determines whether access from a node not registered in the node list 101 has occurred (step S1901). If access from a non-registered node has not occurred (step S1901: NO), the management server M returns to step S1901.

If access from a non-registered node has occurred (step S1901: YES), the management server M registers to the node list 101, the node number, the IP address, and the port number of the accessing non-registered node (step S1902). The management server M refers to the client list 102 and broadcasts to the clients, the update of the node list 101 (step S1903), transmits a reply to the accessing node (step S1904), and ends the node addition processing.

As described, according to the present embodiment, a Bloom filter row BF(p) is transposed to a transposed Bloom filter row tBF(p), whereby memory accesses can be decreased and search speed can be increased. In particular, use of the multilayer transposed Bloom filter tBF enables memory accesses for each level to be reduced, thereby enabling even faster searches to be performed. Further, each node in a node group stores a multilayer transposed Bloom filter tBF, enabling the volume of data that can be managed to be increased.

Further, until determination that the presence of search data is indicated, unselected nodes from the node group are selected and searches are recursively performed. Thus, searches can be performed without the user being aware that multiple data is distributed among and stored at multiple nodes.

Until nodes that should be selected are exhausted, unselected nodes are selected from the node group and searches are recursively performed. Thus, searches can be performed without the user being aware that multiple data is distributed among and stored at multiple nodes.

By preferentially selecting from the node group, a node that has successfully performed a search, a heuristic of reading in the same order as that of the addition of the data Dx can be used, enabling increased search speed.

Any 1 among the level count, the bit width, and the divisor differs between at least 2 nodes among the node group. Since each of the nodes may store a different multilayer transposed Bloom filter tBF, the volume of data that can be managed can be increased.

The steps depicted in the flowcharts above, for example, are processes implemented by executing a search program stored in a storage device (such as the ROM 402, the RAM 403, the magnetic disk 405, and the optical disk 407 depicted in FIG. 4) on the CPU 401. Further, the execution results may be written to the storage device and read out in response to a read request from another process, as needed.

The search method described in the present embodiment may be implemented by executing a search program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable medium storing therein a search program that causes a transmission source computer to execute a method the method comprising:
   accessing a node group;
   storing, in each node of the node group, a data structure having a multilayer transposed Bloom filter that is transposed by gathering, at each level, bits at identical positions in each Bloom filter constituting a Bloom filter row in a multilayer Bloom filter having a level count h, a bit width s, a divisor d of an h-th level of arranged bits indicating false positive or negative, a p-th ($1 \leq p \leq h$) level Bloom filter bit width $m = s/d^{[h-(p-1)]}$ and a p-th level Bloom filter count $n = d^{[h-(p-1)]}$, the data structure further having a data block set corresponding to a first level Bloom filter row of the multilayer Bloom filter and each node further executing processing that involves using the multilayer transposed Bloom filter to determine whether search data is present in the data block set and transmitting to the transmission source computer of the search data, a search result indicating whether the search data is present;
   selecting from the node group, an unselected node;
   transmitting the search data to the selected node;
   receiving the search result from the selected node;
   determining whether the received search result indicates the search data to be present; and
   outputting a determination result, wherein any one among the level count h, the bit width s, and the divisor d differs between at least two nodes among the node group.

2. The non-transitory computer-readable medium according to claim 1, wherein the selecting to the determining are recursively executed until at the determining, presence of the search data is determined to be indicated.

3. The non-transitory computer-readable medium according to claim 1, wherein the selecting to the determining are recursively executed until all unselected nodes that are to be selected are exhausted.

4. The non-transitory computer-readable medium according to claim 1, wherein the selecting includes preferentially selecting from the node group, a node that has successfully performed a search.

5. A non-transitory computer-readable medium storing therein a search program that causes any one node among a node group to execute a method, the method comprising:
   storing, in each node of the node group, a data structure having a multilayer transposed Bloom filter that is transposed by gathering, at each level, bits at identical positions in each Bloom filter constituting a Bloom filter row in a multilayer Bloom filter having a level count h, a bit width s, a divisor d of an h-th level of arranged bits indicating false positive or negative, a p-th ($1 \leq p \leq h$) level Bloom filter bit width $m = s/d^{[h-(p-1)]}$ and a p-th level Bloom filter count $n = d^{[h-(p-1)]}$, the data structure further having a data block set corresponding to a first level Bloom filter row of the multilayer Bloom filter;
   receiving search data;
   determining whether the received search data is present in the data block set, using the multilayer transposed Bloom filter; and
   transmitting to a transmission source of the search data, a search result indicating whether the search data is present, wherein any one among the level count h, the bit width s, and the divisor d differs between at least two nodes among the node group.

6. A search method executed by a transmission source computer, the transmission source computer having access to a node group, the search method comprising:

storing, in each node of the node group, a data structure having a multilayer transposed Bloom filter that is transposed by gathering, at each level, bits at identical positions in each Bloom filter constituting a Bloom filter row in a multilayer Bloom filter having a level count h, a bit width s, a divisor d of an h-th level of arranged bits indicating false positive or negative, a p-th ($1 \leq p \leq h$) level Bloom filter bit width Bloom filter bit width $m=s/d^{[h-(p-1)]}$ and a p-th level Bloom filter count $n=d^{[h-(p-1)]}$, the data structure further having a data block set corresponding to a first level Bloom filter row of the multilayer Bloom filter and each node further executing processing that involves using the multilayer transposed Bloom filter to determine whether search data is present in the data block set and transmitting to the transmission source computer of the search data, a search result indicating whether the search data is present;

selecting from the node group, an unselected node;
transmitting the search data to the selected node;
receiving the search result from the selected node;
determining whether the received search result indicates the search data to be present; and
outputting a determination result, wherein
any one among the level count h, the bit width s, and the divisor d differs between at least two nodes among the node group.

7. A search method executed by any one node among a node group, the search method comprising:

storing, in each node of the node group, a data structure having a multilayer transposed Bloom filter that is transposed by gathering, at each level, bits at identical positions in each Bloom filter constituting a Bloom filter row in a multilayer Bloom filter having a level count h, a bit width s, a divisor d of an h-th level of arranged bits indicating false positive or negative, a p-th ($1 \leq p \leq h$) level Bloom filter bit width Bloom filter bit width $m=s/d^{[h-(p-1)]}$ and a p-th level Bloom filter count $n=d^{[h-(p-1)]}$, the data structure further having a data block set corresponding to a first level Bloom filter row of the multilayer Bloom filter;

receiving search data;
determining whether the received search data is present in the data block set, using the multilayer transposed Bloom filter; and
transmitting to a transmission source of the search data, a search result indicating whether the search data is present, wherein
any one among the level count h, the bit width s, and the divisor d differs between at least two nodes among the node group.

8. A search apparatus having access to a node group, the search apparatus comprising:

a processor that:

stores, in each node of the node group, storing a data structure having a multilayer transposed Bloom filter that is transposed by gathering, at each level, bits at identical positions in each Bloom filter constituting a Bloom filter row in a multilayer Bloom filter having a level count h, a bit width s, a divisor d of an h-th level of arranged bits indicating false positive or negative, a p-th ($1 \leq p \leq h$) level Bloom filter bit width Bloom filter bit width $m=s/d^{[h-(p-1)]}$ and a p-th level Bloom filter count $n=d^{[h-(p-1)]}$, the data structure further having a data block set corresponding to a first level Bloom filter row of the multilayer Bloom filter and each node further executing processing that involves using the multilayer transposed Bloom filter to determine whether search data is present in the data block set and transmitting to the search apparatus, which is a transmission source of the search data, a search result indicating whether the search data is present, selects from the node group, an unselected node;
transmits the search data to the selected node;
receives the search result from the selected node;
determines whether the received search result indicates the search data to be present; and
outputs a determination result,
wherein any one among the level count h, the bit width s, and the divisor d differs between at least two nodes among the node group.

9. A search apparatus comprising:

any one node among a node group, each node of the node group storing a data structure having a multilayer transposed Bloom filter that is transposed by gathering, at each level, bits at identical positions in each Bloom filter constituting a Bloom filter row in a multilayer Bloom filter having a level count h, a bit width s, a divisor d of an h-th level of arranged bits indicating false positive or negative, a p-th ($1 \leq p \leq h$) level Bloom filter bit width Bloom filter bit width $m=s/d^{[h-(p-1)]}$ and a p-th level Bloom filter count $n=d^{[h-(p-1)]}$ the data structure further having a data block set corresponding to a first level Bloom filter row of the multilayer Bloom filter;

a processor that receives search data, determines whether the received search data is present in the data block set, using the multilayer transposed Bloom filter, and transmits to a transmission source of the search data, a search result indicating whether the search data is present, wherein any one among the level count h, the bit width s, and the divisor d differs between at least two nodes among the node group.

* * * * *